(12) United States Patent
Catalano

(10) Patent No.: US 12,133,492 B2
(45) Date of Patent: Nov. 5, 2024

(54) ROOT PRUNING AND AIR PURIFYING PLANT POT

(71) Applicant: Frank Catalano, Lebanon, CT (US)

(72) Inventor: Frank Catalano, Lebanon, CT (US)

(73) Assignee: NAKED ROOT, LLC, Lebanon, CT (US)

( * ) Notice: Subject to any disclaimer, the term of this patent is extended or adjusted under 35 U.S.C. 154(b) by 77 days.

(21) Appl. No.: 17/894,103

(22) Filed: Aug. 23, 2022

(65) Prior Publication Data

US 2023/0067983 A1    Mar. 2, 2023

Related U.S. Application Data

(60) Provisional application No. 63/237,488, filed on Aug. 26, 2021.

(51) Int. Cl.
| | | |
|---|---|---|
| *A01G 9/02* | (2018.01) | |
| *A01G 9/00* | (2018.01) | |
| *A01G 24/25* | (2018.01) | |
| *A01G 27/02* | (2006.01) | |

(52) U.S. Cl.
CPC .............. *A01G 9/02* (2013.01); *A01G 24/25* (2018.02); *A01G 27/02* (2013.01); *A01G 2009/003* (2013.01)

(58) Field of Classification Search
CPC ....... A01G 2009/003; A01G 9/02; B65D 1/38
See application file for complete search history.

(56) References Cited

U.S. PATENT DOCUMENTS

| | | |
|---|---|---|
| 726,766 A | 4/1903 | Schaefer |
| 955,644 A | 4/1910 | Hershkovitz |
| 2,189,982 A | 2/1940 | Haglund |
| 2,550,602 A | 4/1951 | Rothe |
| 3,733,746 A | 5/1973 | Allen, Jr. |
| 3,758,987 A | 9/1973 | Crane, Jr. |
| 3,785,088 A | 1/1974 | Guarriello |
| 4,001,967 A | 1/1977 | Swift et al. |
| 4,096,663 A | 6/1978 | Silver |
| 4,100,699 A | 7/1978 | Skaife |
| 4,216,623 A | 8/1980 | Silver |
| 4,324,070 A | 4/1982 | Swisher |
| 4,329,815 A | 5/1982 | Secrest |
| 4,715,144 A | 12/1987 | Lee |
| 5,054,235 A | 10/1991 | Pilz |
| D326,552 S * | 5/1992 | Goodell ........................ D3/312 |
| 5,241,784 A | 9/1993 | Henry |
| 5,433,923 A | 7/1995 | Wolverton et al. |

(Continued)

FOREIGN PATENT DOCUMENTS

| | | | |
|---|---|---|---|
| EP | 1175825 A2 | 1/2002 | |
| KR | 101191318 B1 * | 10/2012 | ........... A01G 27/008 |
| KR | 20130005315 U * | 9/2013 | ............. A01G 9/028 |

*Primary Examiner* — Tien Q Dinh
*Assistant Examiner* — William L Gmoser
(74) *Attorney, Agent, or Firm* — LOZA & LOZA, LLP; Kevin L. Soules

(57) ABSTRACT

A pot system and apparatus comprises an outer shell, an inner vented container configured to fit inside the outer shell, the inner vented container further comprising: a top lip, an upper basket, and a soil chamber, the pot system being configured to prevent root rot, provide air pruning, and to foster bacterial growth and air circulation to passively scrub indoor air.

14 Claims, 19 Drawing Sheets

(56) References Cited

U.S. PATENT DOCUMENTS

| | | | |
|---|---|---|---|
| 5,782,035 A | 7/1998 | Locke et al. | |
| 5,918,415 A | 7/1999 | Locke et al. | |
| 6,357,180 B1 | 3/2002 | Huang | |
| 6,729,070 B1 | 5/2004 | Locke et al. | |
| 6,783,023 B1* | 8/2004 | Fan | A01G 9/02 |
| | | | 220/636 |
| 7,000,351 B2 | 2/2006 | Baumann | |
| 7,730,666 B2 | 6/2010 | Spray | |
| 8,051,603 B1 | 11/2011 | Jung | |
| 8,510,988 B2 | 8/2013 | Anderson et al. | |
| 8,894,741 B2 | 11/2014 | Mittelmark | |
| 9,668,428 B1* | 6/2017 | Frame | A01G 9/028 |
| 9,930,840 B1 | 4/2018 | Gergek | |
| 10,076,085 B2 | 9/2018 | Holby | |
| 10,398,098 B2 | 9/2019 | Gergek | |
| 2005/0086861 A1* | 4/2005 | Atchley | A01G 9/02 |
| | | | 47/65.5 |
| 2008/0110089 A1 | 5/2008 | Spray | |
| 2015/0373933 A1 | 12/2015 | Hansen | |
| 2016/0050857 A1 | 2/2016 | Roberts | |
| 2017/0303481 A1 | 10/2017 | Marshall | |
| 2021/0337754 A1* | 11/2021 | Palumbo | A01G 2/20 |

\* cited by examiner

ROOT PRUNING AND AIR PURIFYING PLANT POT

CROSS REFERENCE TO RELATED PATENT APPLICATIONS

This application claims the priority and benefit under 35 U.S.C. § 119(e) of U.S. Provisional Patent Application Ser. No. 63/237,488 filed Aug. 26, 2021, entitled "ROOT PRUNING AND AIR PURIFYING PLANT POT." U.S. Provisional Patent Application Ser. No. 63/237,488 is herein incorporated by reference in its entirety.

TECHNICAL FIELD

Embodiments are generally related to the field of plant pots. Embodiments are further related to the field of nested pot arrangements. Embodiments are further related to methods, systems, and apparatuses for self-watering plant pots. Embodiments are further related to methods, systems, and apparatuses for root aerating pots. Embodiments are further related to methods, systems, and apparatuses for air pruning pots. Embodiments are further related to methods, systems, and apparatuses for side watering pots. Embodiments are further related to methods, systems, and apparatuses for passive air purification.

BACKGROUND

Since time immemorial humans have used receptacles to cultivate plant growth. Historians believe the first pots were invented some 12,000 years ago in East Asia. While the basic benefit of contained plant growth is self-explanatory, many advances to potting technology have been made. Modern technology has resulted in improvements to the design and manufacture of pots that have numerous benefits.

Nevertheless, current pot designs still suffer from various disadvantages. For example, standard pots are not well suited to indicate the water level in the pot. It is important to avoid overwatering, which can lead to root rot. Root rot is a condition that effects plant roots exposed to water for extended periods of time, which creates the condition for anaerobic root disease to develop on plant roots. Root rot is the number one reason most house plants die. Solutions such as moisture monitors have been developed to address this issue, but such solutions are inconvenient, inaccurate, and cost inefficient.

Furthermore, standard pots do not allow sufficient air flow to plant roots. This limits the growth potential of plants growing in standard pots. Standard pots also tend to direct and or stunt root growth. As the roots of the plant reach the walls, they are forced to grow in sub optimal root patterns.

Finally, plants serve as a fundamental source of air purification in the natural word. Recent advances in pot technology seek to take advantage of this with active solutions, such as fans, used to draw air through plant soil. However, these solutions require a power source, are complicated, and include energy costs to operate correctly.

As such, there is a need in the art for improved plant pots systems and methods that address the aforementioned shortcomings, as disclosed in the embodiments detailed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide improved plant pots.

It is another aspect of the disclosed embodiments to provide pots that facilitate healthier plants.

It is another aspect of the disclosed embodiments to provide plant pots with simple, intuitive, easy watering and watering level monitoring.

It is another aspect of the disclosed embodiments to provide pots that facilitate air pruning.

It is another aspect of the disclosed embodiments to provide methods, systems, and apparatuses for passive phytoremediation and/or air purification.

It will be appreciated that the methods and systems can be achieved according to the embodiments disclosed herein. In an embodiment, a pot apparatus comprises an outer shell and an inner vented container configured so that space between the outer shell and the inner vented container supports air circulation between the outer shell and the inner vented container. In an embodiment the pot apparatus further comprises a spout configured on the outer shell. In an embodiment, the spout further comprises a protrusion for accepting water. In an embodiment the pot apparatus further comprises at least one vent in the outer shell. In an embodiment, the vent further comprises a plurality of slits and apertures. In an embodiment, the inner vented container further comprises a grid of supports. In an embodiment, the grid of supports comprises a plurality of horizontal supports and a plurality of material containing strips. In an embodiment, the inner vented container further comprises a lower cylinder. In an embodiment the pot apparatus further comprises a plurality of offset struts configured to separate the outer shell from the inner vented container. In an embodiment the pot apparatus further comprises a soil mixture disposed in the inner vented container, the soil mixture comprising at least one of Coco Coir soil medium, Mycorrhizal Fungi Inoculant, and Organic Humic soil.

In an embodiment, a pot comprises an outer shell, an inner vented container configured to fit inside the outer shell, the inner vented container further comprising: an upper basket and a lower wicking chamber.

In an embodiment, the pot further comprises a spout configured on the outer shell, the spout further comprising a protrusion for accepting water. In an embodiment, the pot further comprises at least one vent in the outer shell. In an embodiment, the lower wicking chamber further comprises a substantially x-shaped base and at least one concave cutaway side. In an embodiment, the upper basket further comprises a plurality of vents.

In an embodiment, a pot system comprises an outer shell, an inner vented container configured to fit inside the outer shell, the inner vented container further comprising: a top lip, an upper basket, and a soil chamber. In an embodiment, the outer shell further comprises a spout and at least one vent. In an embodiment, the inner vented container further comprises at least one concave side. In an embodiment, the inner vented container further comprises a base configured to fit inside the outer shell and at least one vent formed in the base. In an embodiment, the inner vented container further comprises at least one vent in the upper basket.

BRIEF DESCRIPTION OF THE FIGURES

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1A:
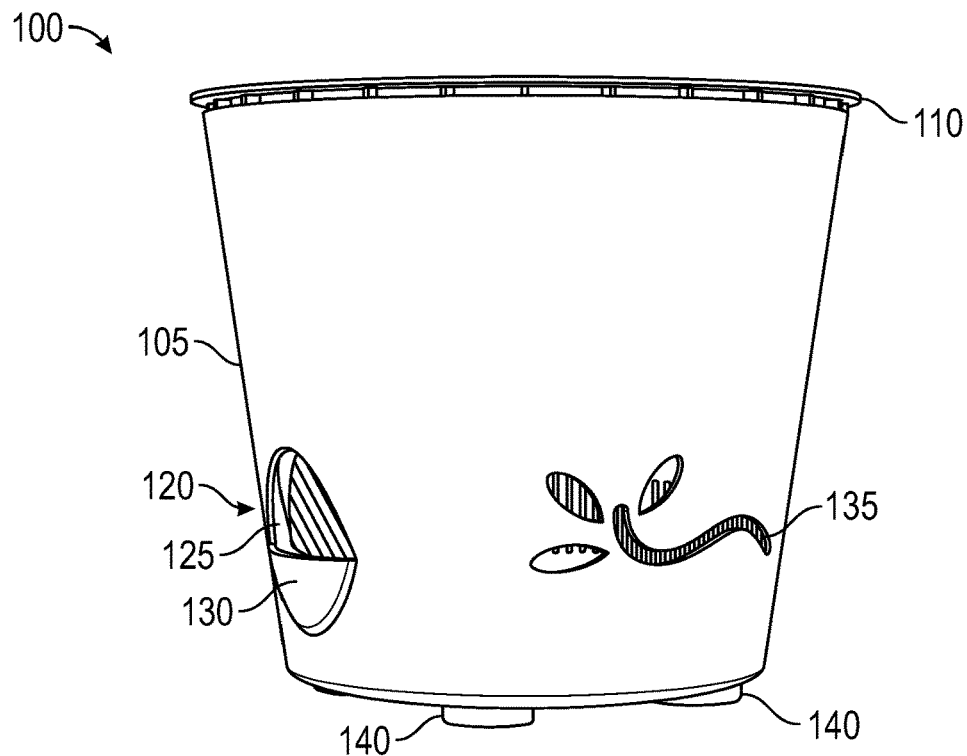
FIG. 1A depicts an elevation view of a pot system/apparatus, in accordance with the disclosed embodiments.

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

Figure 1B:
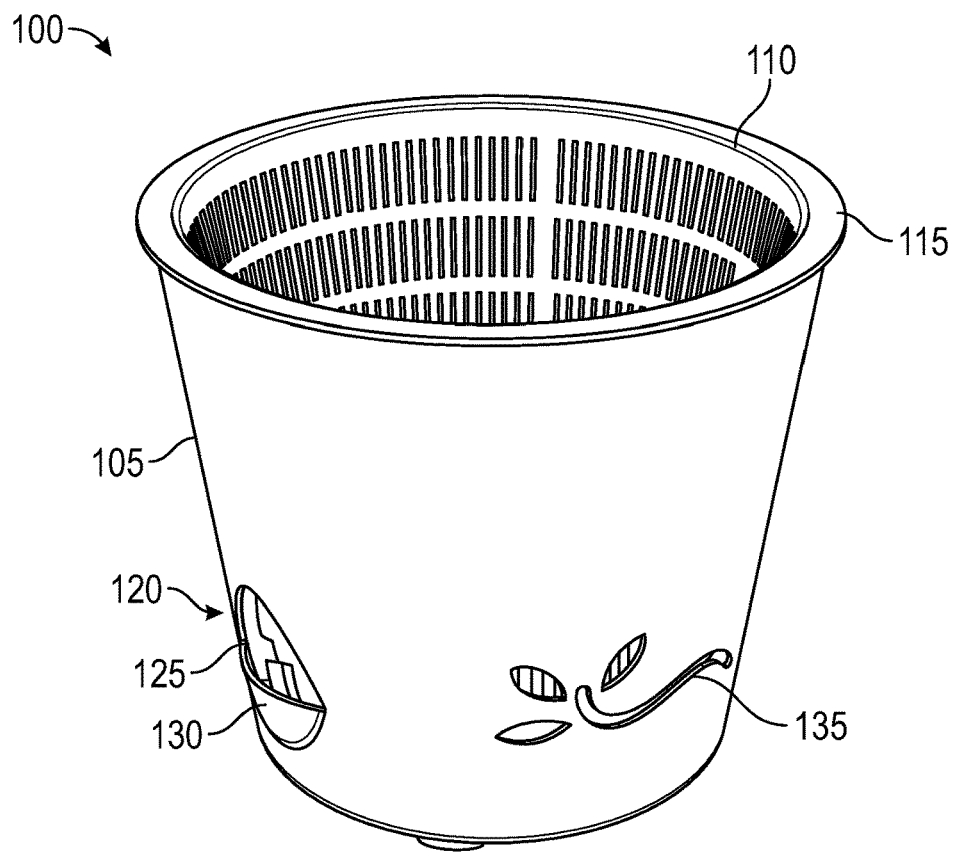
FIG. 1B depicts a perspective view of a pot system/apparatus, in accordance with the disclosed embodiments.

FIGS. 1A and 1B illustrate a pot 100 (or naked root planter) in elevation and perspective, in accordance with the disclosed embodiments. The pot 100 generally comprises an outer shell 105 and an inner vented container 110. The outer shell 105 is configured to hold the inner vented container 110 in a nested arrangement. The diameter of the inner vented container 110 is generally smaller than the diameter of the outer shell 105. The top of the inner vented container 110 can contain a lip 115 that extends over the top diameter of the outer shell 105, as illustrated in FIGS. 1A and 1B.

The outer shell 105 can further include a spout 120 configured to include an opening 125 with an upward facing protrusion 130 for accepting water. The protrusion 130 can be generally domed shaped in certain embodiments, to catch water, but other shapes can also be used. The opening 125 can be selected to be sufficiently large to allow a view to the bottom of the outer shell 105. This can facilitate water level inspection.

The outer shell 105 can also include at least one air vent 135. One such air vent 135 is illustrated in FIGS. 1A and 1B, but in other embodiments, additional air vents can be provided. In certain embodiments, the air vents 135 can be configured to include multiple shaped slots and apertures. In certain embodiments, these slots and apertures can be arranged in a manner that is aesthetically pleasing. In FIGS. 1A and 1B the air vent 135 is configured to resemble a plant, but other such designs are possible.

The outer shell 105 can further include one or more legs 140 or standoffs. The legs 140 raise the bottom surface of the pot 100 off the underlying substrate. This configuration helps prevent condensation on the exterior of the pot 100 from collecting on, and damaging, the underlying surface. The bottoms of the legs 140 can include non-slip pads, stickem, or other such friction increasing medium to prevent the legs 140 from sliding.

Figure 2A:
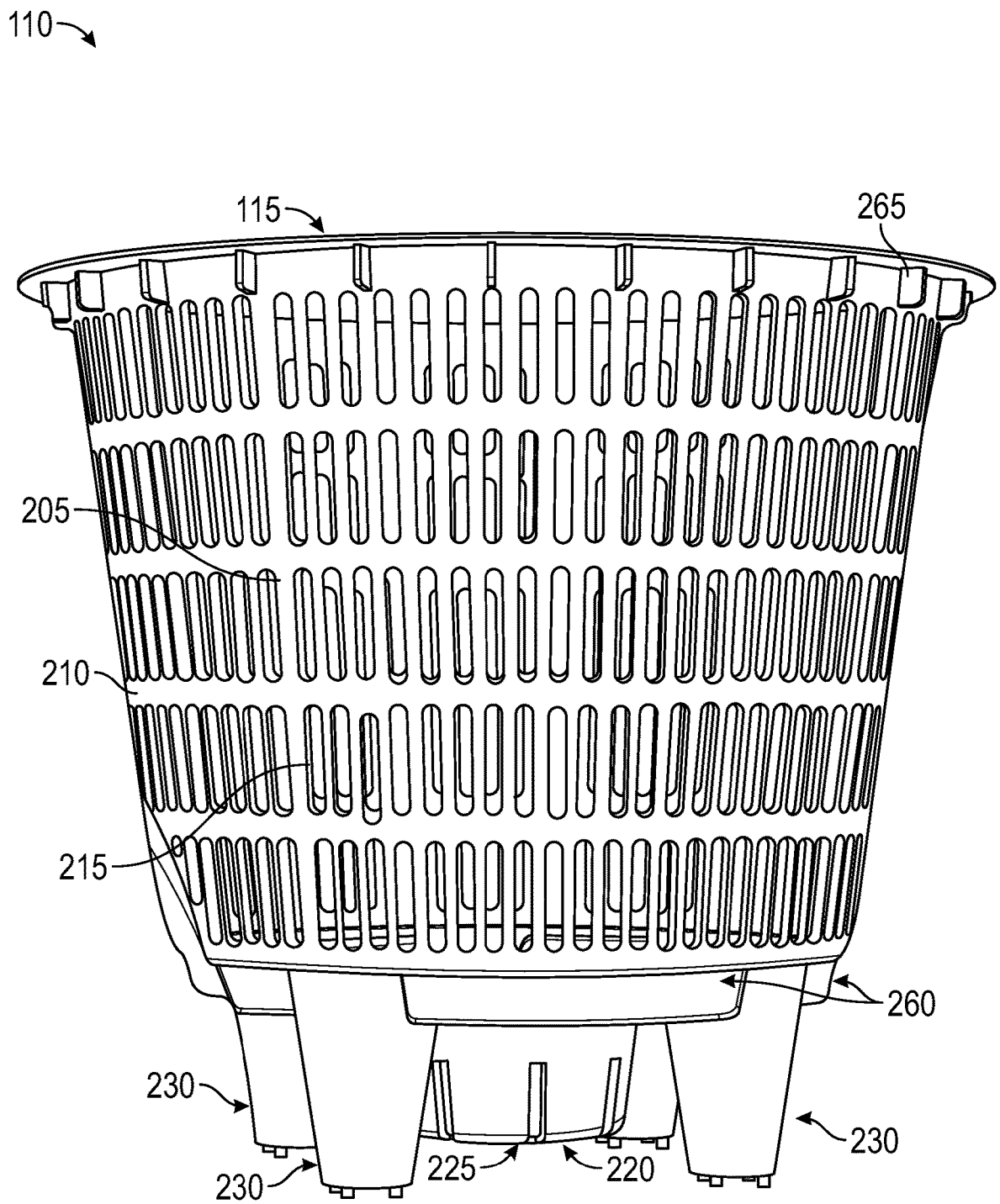
FIG. 2A depicts an elevation view of a vented inner container, in accordance with the disclosed embodiments.
Figure 2B:
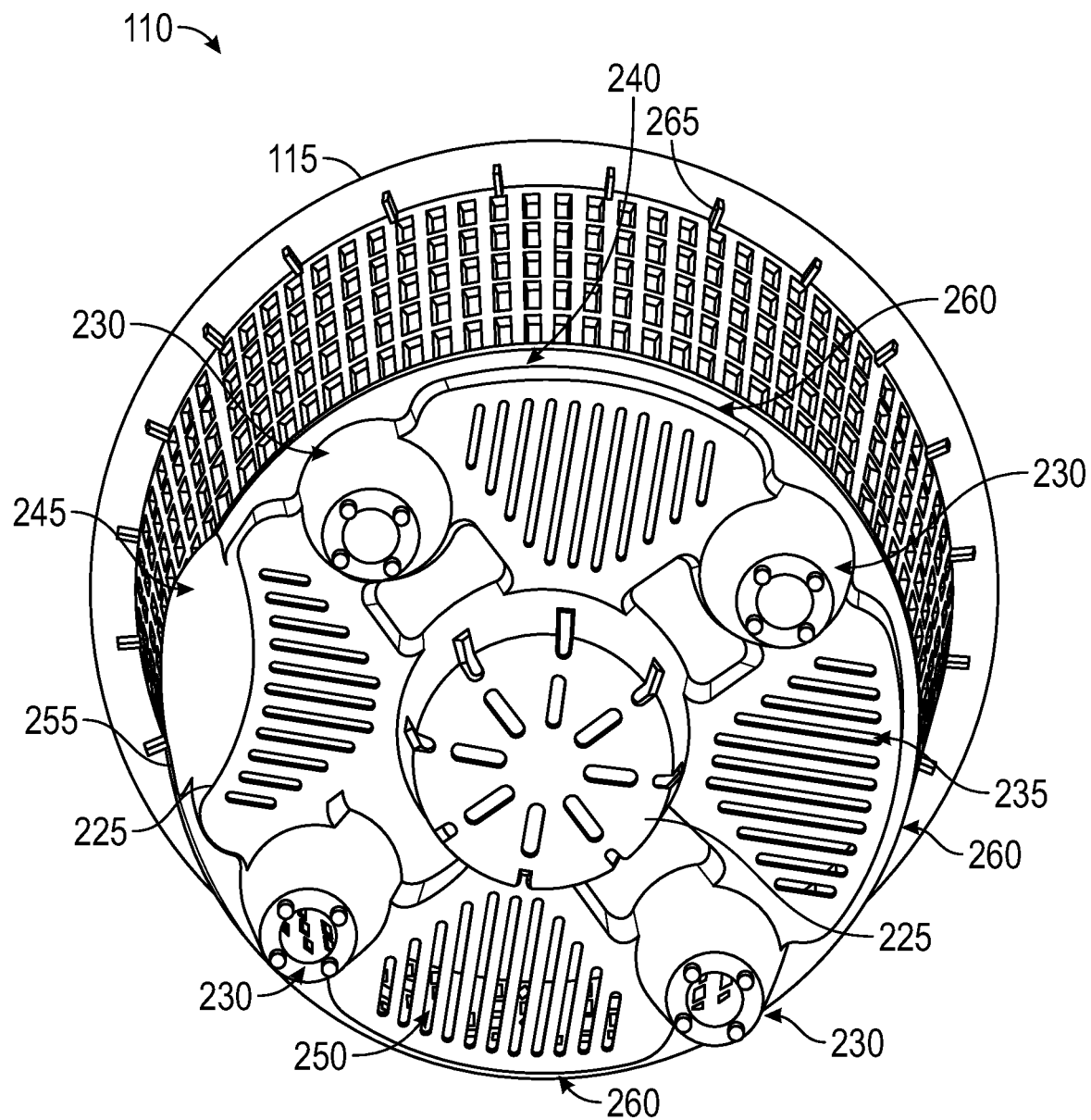
FIG. 2B depicts a bottom view of a vented inner container, in accordance with the disclosed embodiments.

FIGS. 2A and 2B illustrate aspects of the inner vented container 110 in accordance with the disclosed embodiments. FIG. 2A provides an elevation view of one such inner vented container 110. As shown, the inner vented container 110 can resemble a basket. The inner vented container can include a plurality of vertically arranged support struts 205, and a plurality of intersecting horizontal supports 210 that define a grid of supports. A plurality of thinner material containing strips 215 can be configured within the grid of supports. In combination, this arrangement creates a basket like structure. The spacing defined by the grid can be sufficiently narrow to prevent soil root mixture from indiscriminately spilling out of the inner vented container 110.

It is an aspect of the disclosed embodiments to provide a system for air pruning. Air pruning is a method of promoting plant health by exposing roots to air. The interaction between the roots and air stops the root at the interface. Traditional pots do not create an air root interface, so once the root reaches the edge of the pot, it curls back creating unhealthy tangled root formations. The plant is more likely fail to establish a normal root structure in such an environment, and will likely suffer from reduced intake of water and nutrients.

By contrast, providing maximum oxygen to plant soil, including roots on all surfaces, top, bottom and sides, prevents roots from rotting, the number one reason for plant failure in container plants. When roots are exposed to oxygen the root tip stops growing, causing an explosion of root hairs to grow along the root stem, resulting in a super dense root system. More root structure creates a more robust plant, which is able to absorb more water, nutrients, and oxygen. As a result of a more robust root system with extensive fibrous roots, plants can live in the same planter for a much longer period of time. In addition, exposing roots and soil to outside air allows soil microbes to ingest air pollutants, resulting in a cleaner living environment.

Figure 3:
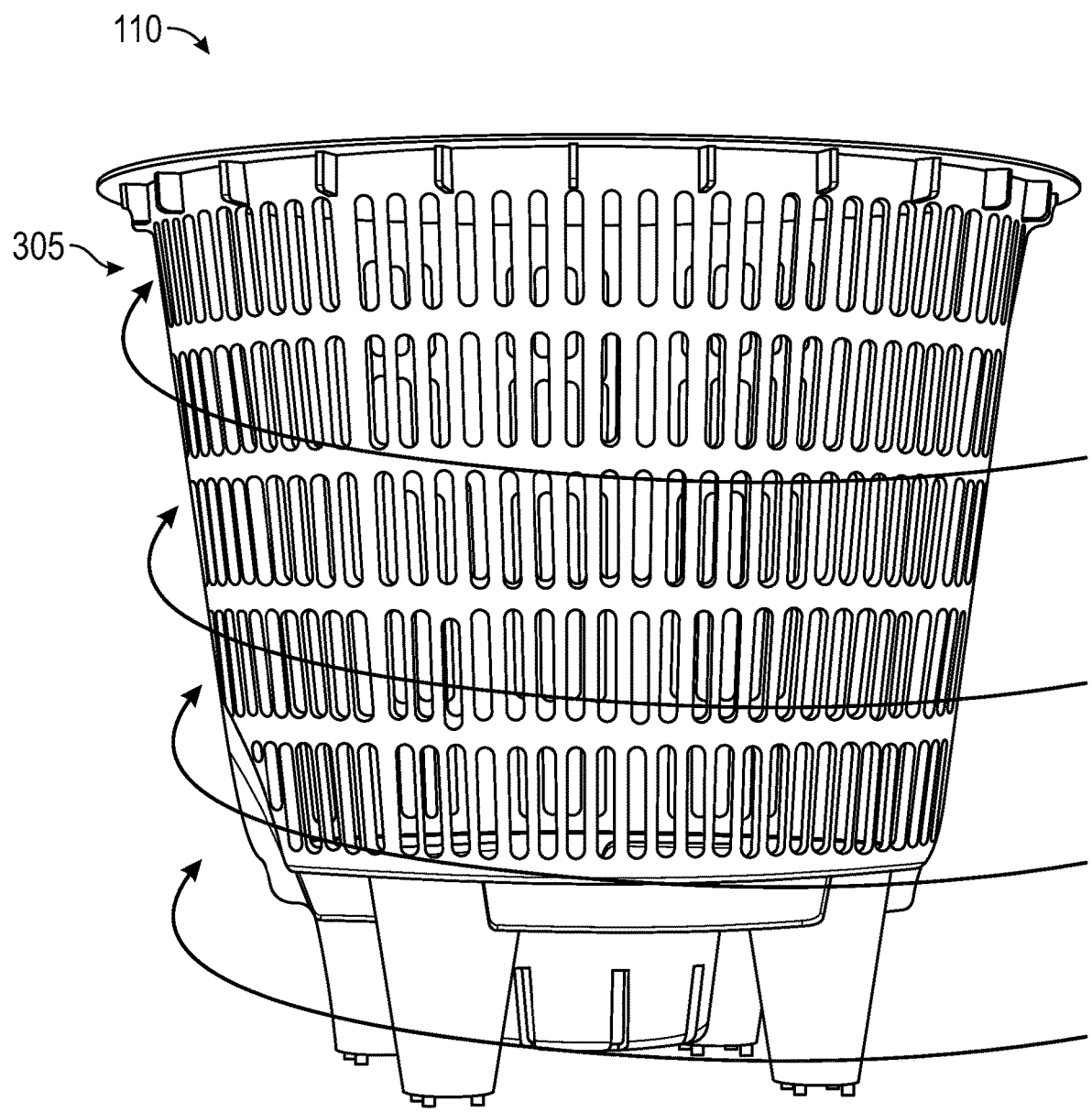
FIG. 3 depicts air circulation around a vented inner container, in accordance with the disclosed embodiments.

FIG. 3 illustrates the dynamic air flow passively achieved by the embodiments disclosed herein. As illustrated, a space, formed between the outer shell and inner vented container 110, allows air 305 to circulate through the pot around the surfaces of the inner vented container 110. The vents in the inner vented container 110 allow air 305 to interface with the roots and soil contained in the inner vented container 110 along the vertical extent of the inner vented container 110, along the bottom of the inner vented container 110, and along the topsoil surface, providing effective passive air pruning and phytoremediation.

The spacing of the material containing strips 215 on the inner vented container 110, as illustrated in FIGS. 2A and 2B, can be selected to be spaced to provide optimal air pruning of roots contained in the pot 100. The spacing can be selected to prevent soil spilling out of the inner vented container 110, while maximizing the surface area available for soil/root interfacing with circulating air.

The inner vented container 110 can further include a lower cylinder 220 with a plurality of vents 225 formed therein, and a selection of legs 230, which can, in certain embodiments, configured to be hollow. The legs 230 can generally be configured to fit into the stand offs 140 in the outer shell 105. The bottom of the inner vented container 110 can further include bottom ribs 235 to allow water intake and or air pruning along the lower surface of the inner vented container 110.

The lower cylinder 220 can generally extend downward into water that is poured into the outer shell 105 through the spout 120. However, the bottom of the lower cylinder 220 need not extend as far down as the selection of legs 230. As illustrated in FIG. 2A, the selection of legs 230 can be configured around the lower cylinder 220. The lower cylinder 220 is configured to ensure, plant soil and roots are evenly moistened. The cylinder 220 and legs 230 can be adjusted in size and/or volume to regulate the amount of water being translocated to the soil for optimum wetting and drying. The lower cylinder 220 facilitates capillary action that pulls water through all the nooks and crannies of the soil evenly from below, through the vents in the inner vented container 110 and/or lower cylinder 220, like a straw drawing water up. This configuration provides even moisture distribution, which, when coupled with even drying because of the exposed roots, reduces plant stress and maximizes plant growth.

It should be noted that, in accordance with the disclosed embodiments, even moisture and even drying is another function of the legs 230. The legs 230 serve the purpose of elevating the inner vented container 110 to allow oxygen to enter the bottom of the pot 100, resulting in exposed soil and roots all around, top, sides and bottom.

The lower diameter 240 of the inner vented container 110 can further include a concave section 245. The concave section 245 comprises a generally concave lower portion of the inner vented container 110, defined by a series of ribs 250. The concave section 245 can be configured to align with the position of the spout in the outer shell 105. The lower diameter 240 can further include a grip 255 to improve the ease with which the inner vented container 110 can be grasped. The remainder of the lower diameter 240 can be defined by spacers 260, which serve to hold the bottom of the inner vented container 110 away from the bottom of the outer shell 105.

As further illustrated in FIG. 2A and FIG. 2B, the inner vented container lip 115 can be supported by a series of offset struts 265. The offset struts serve to support the inner vented container lip 115. Further, the offsets struts 265 serve to separate the inner vented container 110 from the outer shell 105, creating a conduit through which air can pass. This conduit facilitates air circulation which can provide air pruning to the plants contained in the inner vented container 110, as well as phytoremediation and passive air purifying as the air passes through the conduit and circulates back into the surrounding environment. In certain embodiments, an optional carbon filter liner can be installed to further promote air purification.

Figure 4:
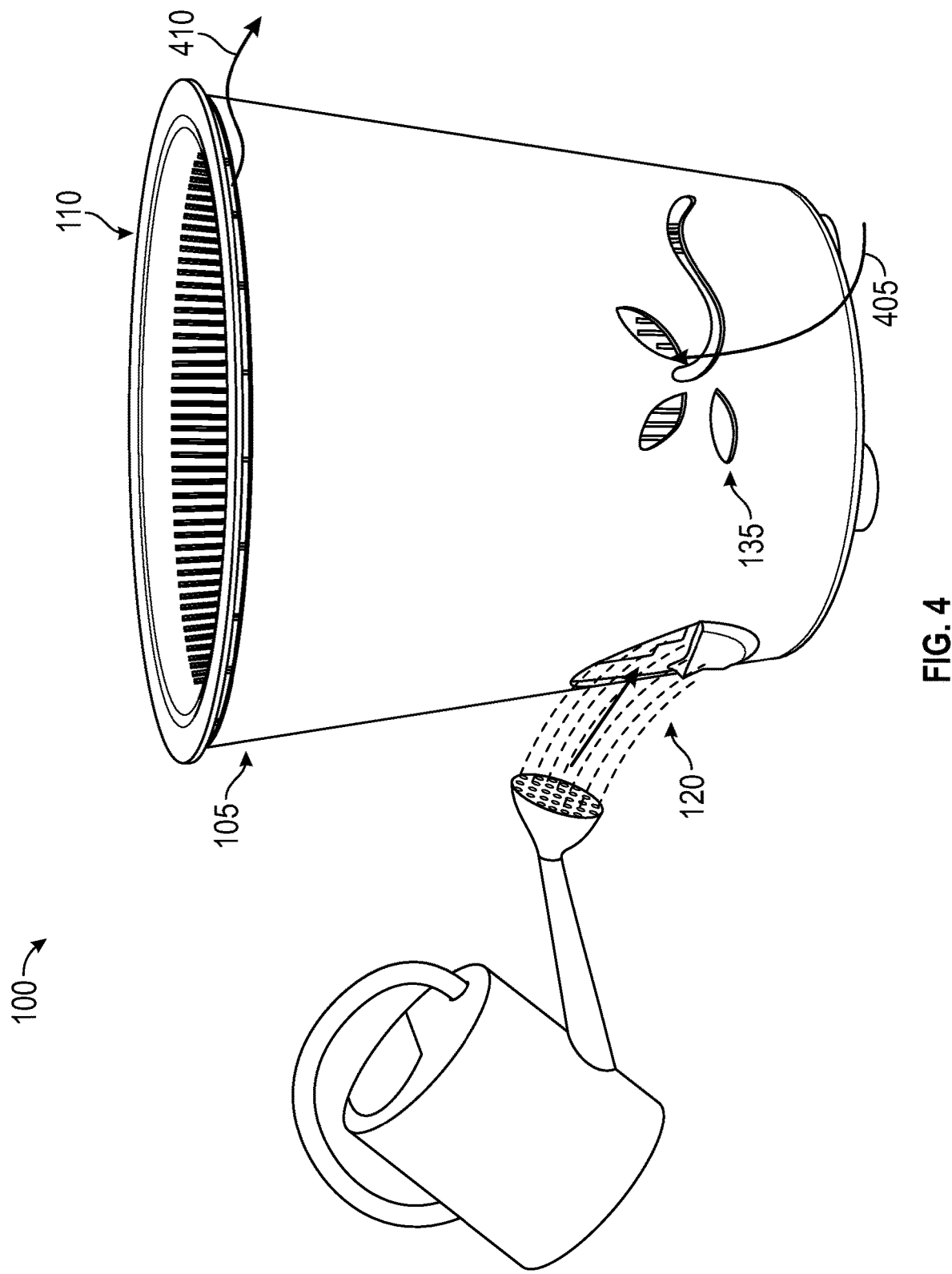
FIG. 4 depicts watering and air flow paths associated with a pot, in accordance with the disclosed embodiments.

FIG. 4 illustrates aspects of the outer shell 105 in accordance with the disclosed embodiments. Specifically, as illustrated by the arrows 405, the vents in the outer shell allow air to enter the system at various locations. The space between the outer shell and inner vented container allows air to circulate (as illustrated in FIG. 3). The circulating air 410 can exit the pot 100 system in the space, formed by the offsets, between the top of the outer shell 105 and inner vented container 110. Air can also enter or exit through other vents formed in the outer shell 105. In certain embodiments, the vents 135 can be configured at various elevations along the outer shell 105 to promote air circulation throughout the pot 100. The location of the vents 135 can further be selected to be above the spout 120 to prevent liquid drainage through the vents 135. The circulating air can provide passive air filtration and phytoremediation.

FIG. 4 further illustrates the use of the spout 120 to add water 415 to the pot 100. The domed shaped protrusion 130 is configured to catch water 415 being added to the pot 100 and reduce drip. The opening associated 125 with the spout 120 is sized to allow visual inspection inside of the outer shell 105. Both the size of the outer shell 105, inner vented container 110, and system 100 as a whole can be selected so that if water is not visible upon inspection, additional water should be added to the pot 100. This solution eliminates the need for water gauges, dampness testing equipment, or other such secondary apparatus to monitor soil moisture. Simply put, when the water is not visible in the reservoir created by the outer shell 105, additional water should be added.

Figure 5B:
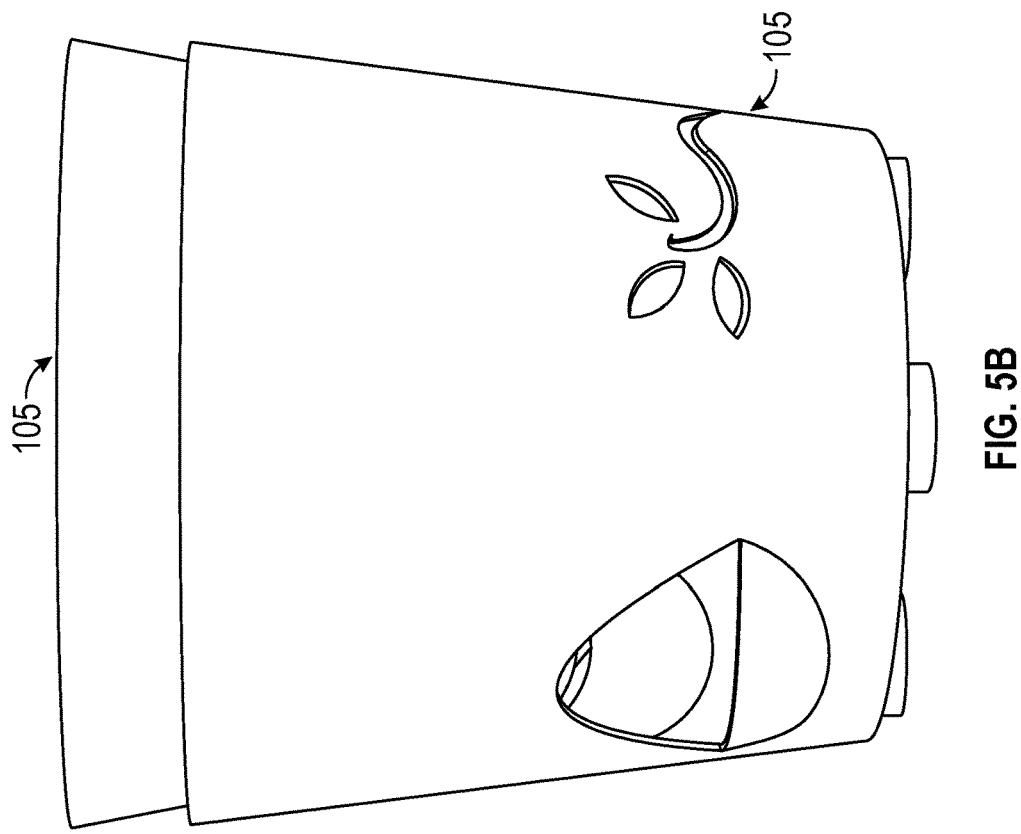
FIG. 5B depicts nested outer shells, in accordance with the disclosed embodiments.
Figure 5A:
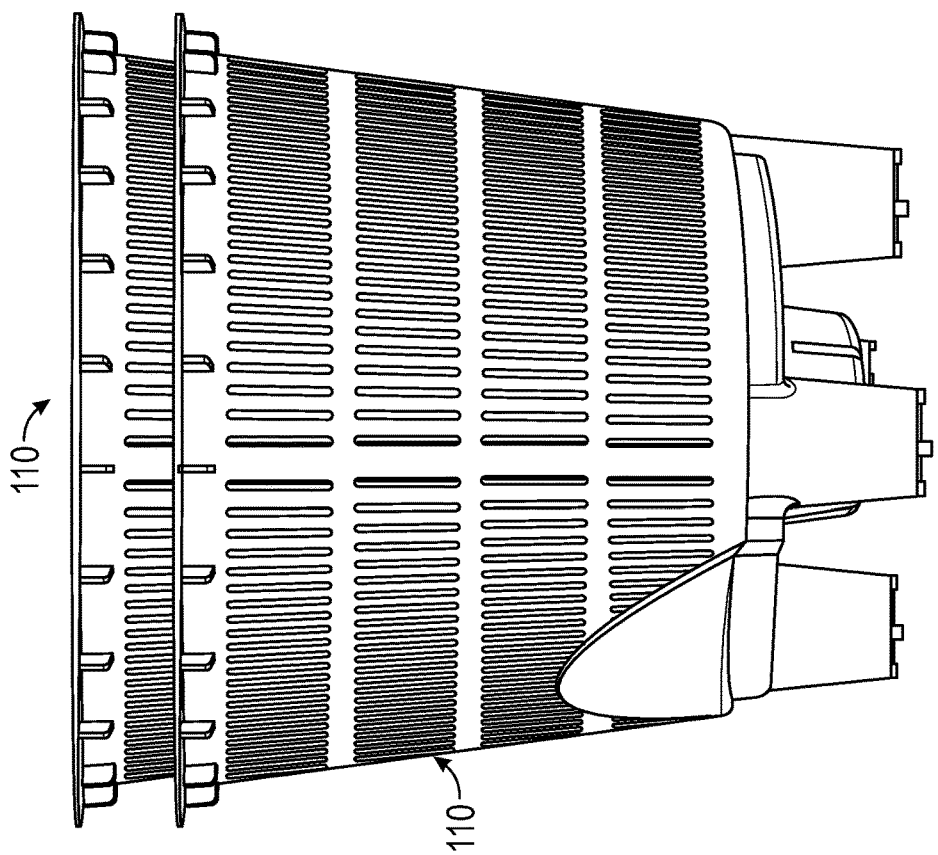
FIG. 5A depicts nested inner vented containers, in accordance with the disclosed embodiments.

The disclosed systems and methods are further configured to be convenient, low maintenance, and inexpensive. As illustrated in FIG. 5, the inner vented containers 110 are configured to be nesting so that multiple units can be stacked one inside the other. Likewise, the outer shells 105 are also configured to be nesting so that multiple shells can be stored one inside the other. In certain embodiments, the assembled pots (inner and outer pots) can also be nested. The disclosed inner vented container 110 and outer shell 105 can be formed of molded plastic, polymer, sheet metal, or other such inexpensive material. The material can be selected to be weather resistant so that the pot 100 can be used indoors or outdoors.

Figure 6:
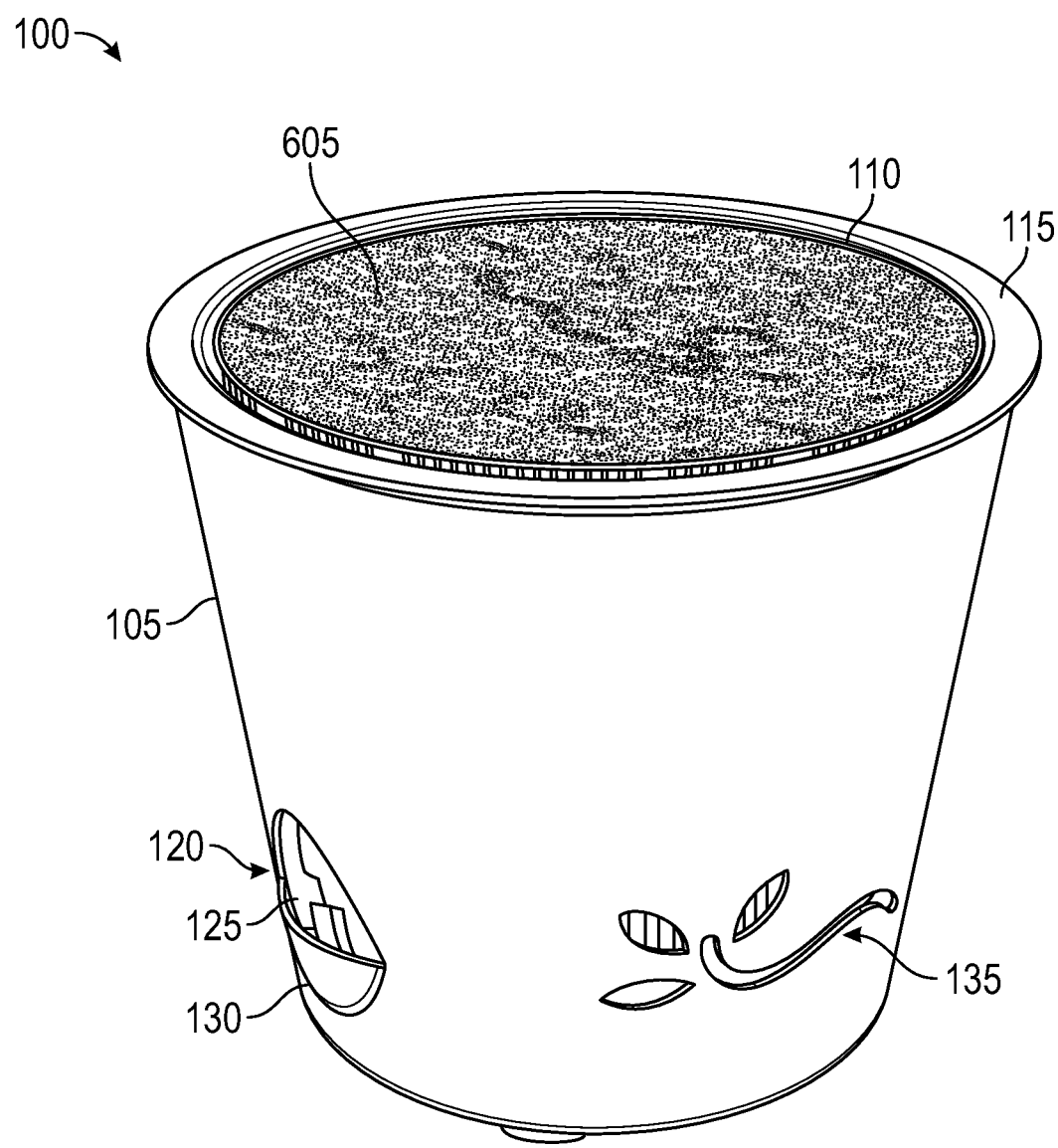
FIG. 6 depicts optimized soil disposed in a pot system, in accordance with the disclosed embodiments.

In certain embodiments, the pots 100 disclosed herein can include specially selected soil mixtures, with certain soil 605 components to optimize root pruning and air purification. Such soil components can comprise Coco Coir soil medium, Mycorrhizal Fungi Inoculant and Organic Humic soil 605 as illustrated in FIG. 6.

In certain embodiments, the soil can comprise or include Endomycorrhiza fungi, in particular species such as, *Glomus intraradices, Glomus mosseae, Glomus aggregatum*, and *Glomus etunicatum*. It should be appreciated that other Mycorrhizae such as Ectomycorrhizae can be used, as well as species such as, *Rhizopogon villosulus, Rhizopogon luteolus, Rhizopogon amylopogon, Rhizopogon fulvigleba, Pisolithus tinctorius, Scleroderma cepa*, and *Scleroderma citrinum*.

As disclosed herein, the systems and methods are configured to maximize exposure of roots and soil to outside air which allows soil microbes to ingest air pollutants, resulting in a cleaner living environment. The disclosed embodiments provide a simple and inexpensive way to improve indoor air quality. It should be noted that having soil and roots exposed on all four sides increases oxygen to soil bacteria and fungi. Increased oxygen to soil bacteria and fungi are responsible for increased populations thereby increasing passive air purification.

Figure 7A:
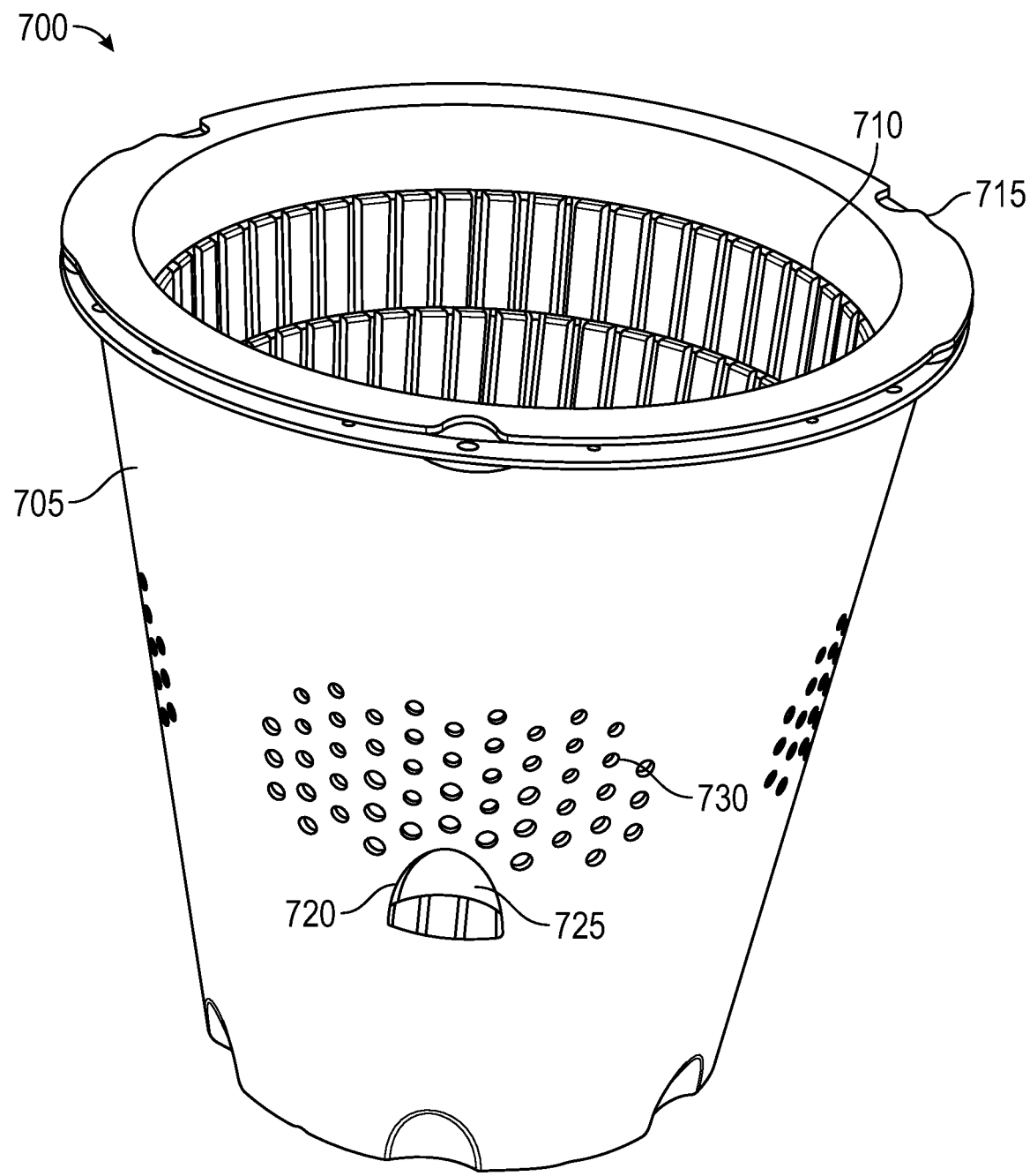
FIGS. 7A-7C illustrate another embodiment of a plant pot, in accordance with the disclosed embodiments.
Figure 7B:
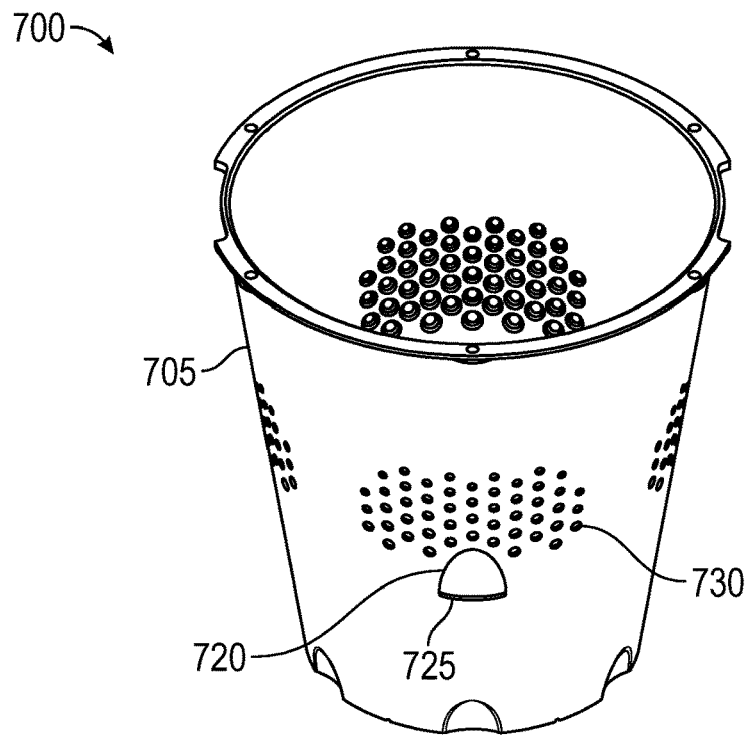
Figure 7C:
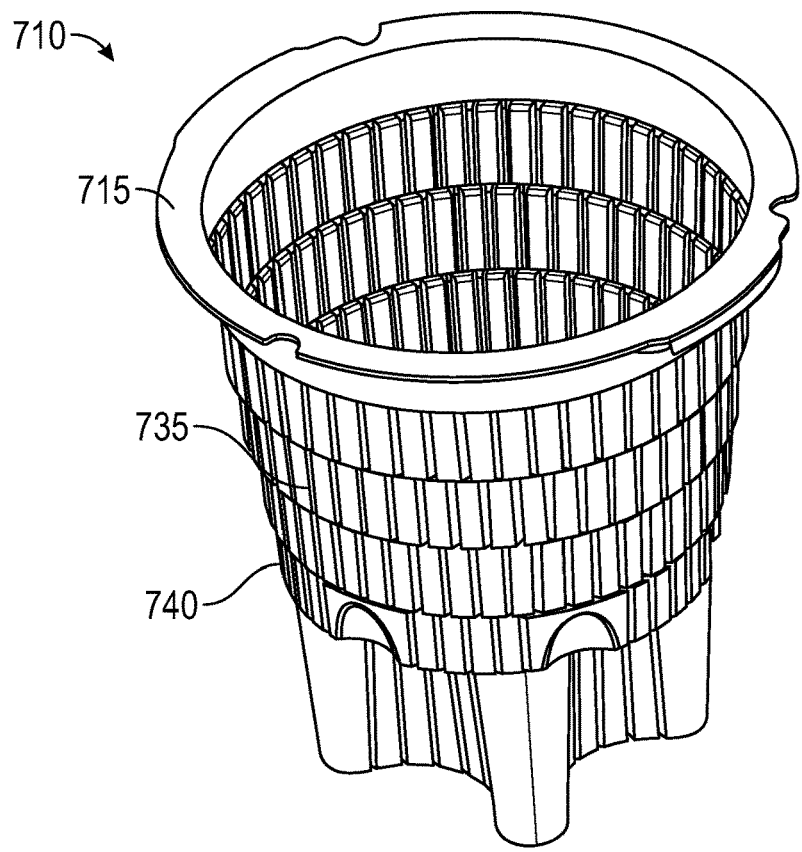

FIGS. 7A-7C illustrate another embodiment of a pot 700 (or naked root planter) in, in accordance with the disclosed embodiments. The pot 700 generally comprises an outer shell 705 and an inner vented container 710. The outer shell 705 is configured to hold the inner vented container 710 in a nested arrangement. The diameter of the inner vented container 710 is generally smaller than the diameter of the outer shell 705. The top of the inner vented container 710 can have a lip 715 that extends over the top diameter of the outer shell 705, as illustrated in FIG. 7A.

The outer shell 705 can further include a spout 720 configured to include an opening 725 with an upward facing protrusion for accepting water. The protrusion can be generally domed shaped in certain embodiments, to catch water, but other shapes can also be used. The opening 725 can be selected to be sufficiently large to allow a view to the bottom of the outer shell 705. This can facilitate water level inspection.

The outer shell 705 can also include at least one air vent 730. One such air vent 730 is illustrated in FIGS. 7A and 7B, but in other embodiments, additional air vents can be provided. In certain embodiments, each of the air vents 730 can be configured to include multiple holes or apertures in grouped relation to one another.

FIG. 7C illustrates the inner vented container 710 in accordance with the disclosed embodiments. As shown, the inner vented container 710 can resemble a basket. The inner vented container 710 can include a plurality of vertically arranged slits 735. A plurality of thinner material containing strips 740 can be configured within the grid of supports. In combination, this arrangement creates a basket like structure. The spacing defined by the grid can be sufficiently narrow to prevent soil root mixture from indiscriminately spilling out of the inner vented container. The inner vented container can be configured to fit inside the outer shell.

FIG. 8A-8D illustrates unique aspects of the inner vented container 710, in accordance with the disclosed embodiments. For example, the inner vented container 710 can include a variety of features that maximize water wicking, water reservoir capacity, ventilation, and stand-alone stability all as a result of the disclosed shape. Specifically, the inner vented container 710 can include a larger upper basket 805, and a lower wicking chamber 810.

The lower wicking chamber 810 can comprise a large inner x-shaped profile 815, with a large volume for holding soil. The large capacity is optimal for wicking of water to the plant and guarantees soil will reach to the bottom of the wicking chamber 810, based on the open design. The concave cutaway sides 820 maximizes the water reservoir capacity, so the frequency of supplying water is dramatically reduced. In addition, the substantially horizontal braces 825 of the upper basket 805 can include large vents 830 to maximize ventilation to the bottom of the plant roots. Finally, the bottom of the lower wicking chamber 810 includes a large surface area, in an x-shaped base 835 that allows the inner vented chamber 710 to stand alone if necessary for various commercial applications.

Figure 8A:
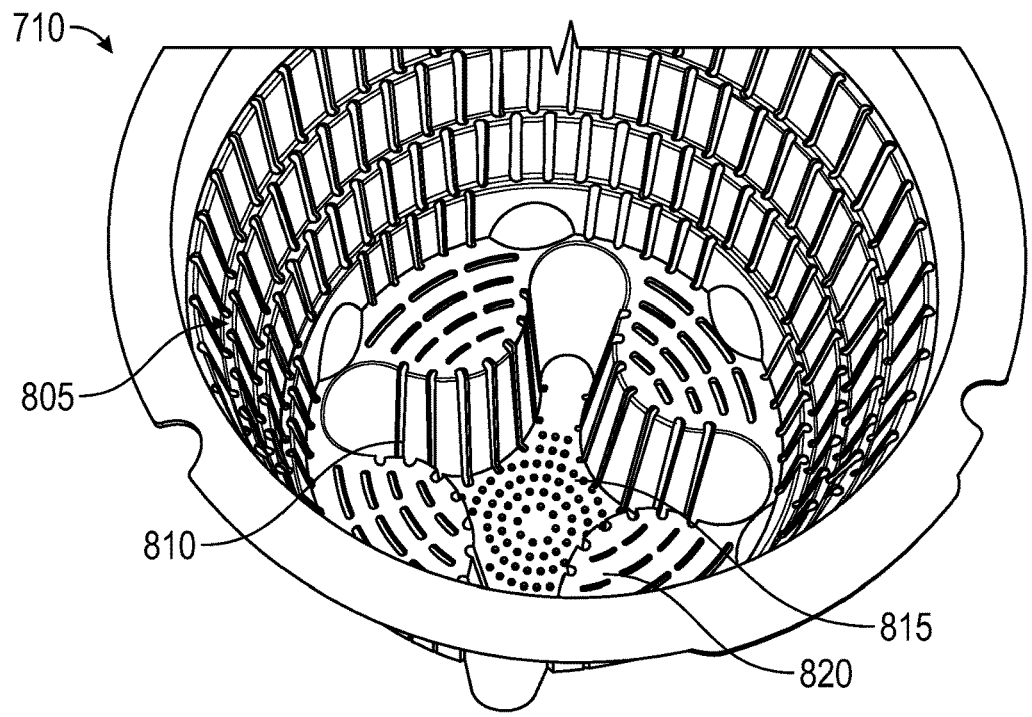
FIGS. 8A-8D illustrates aspects of an inner vented container, in accordance with the disclosed embodiments.
Figure 8B:
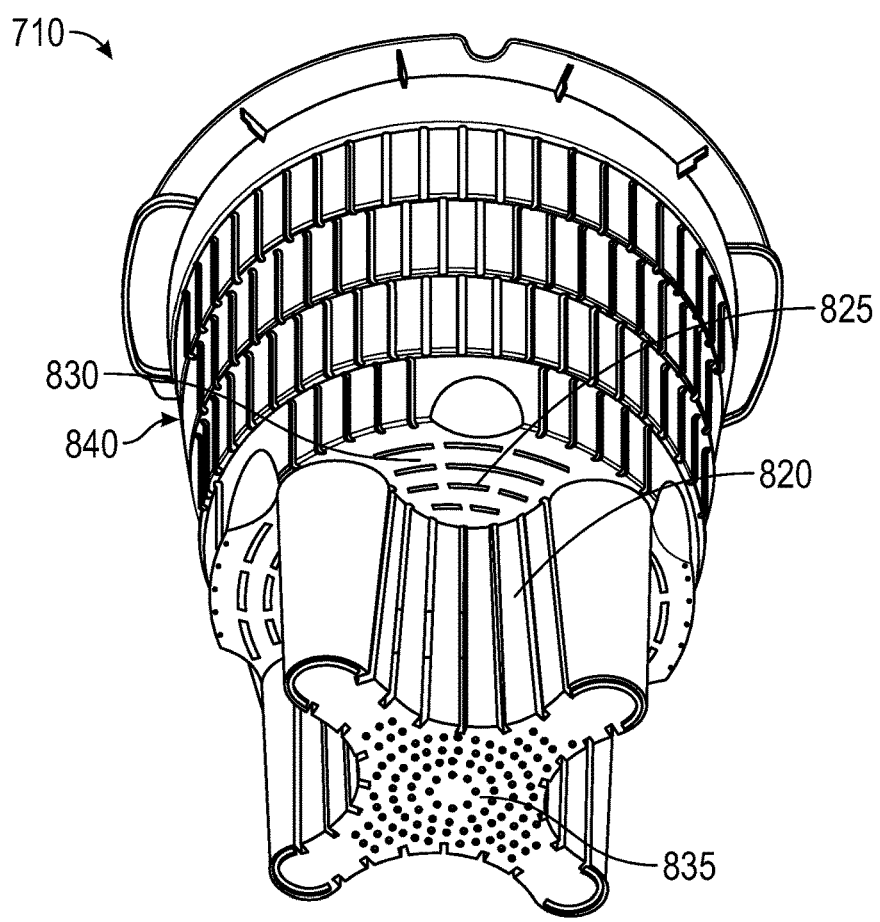
Figure 8C:
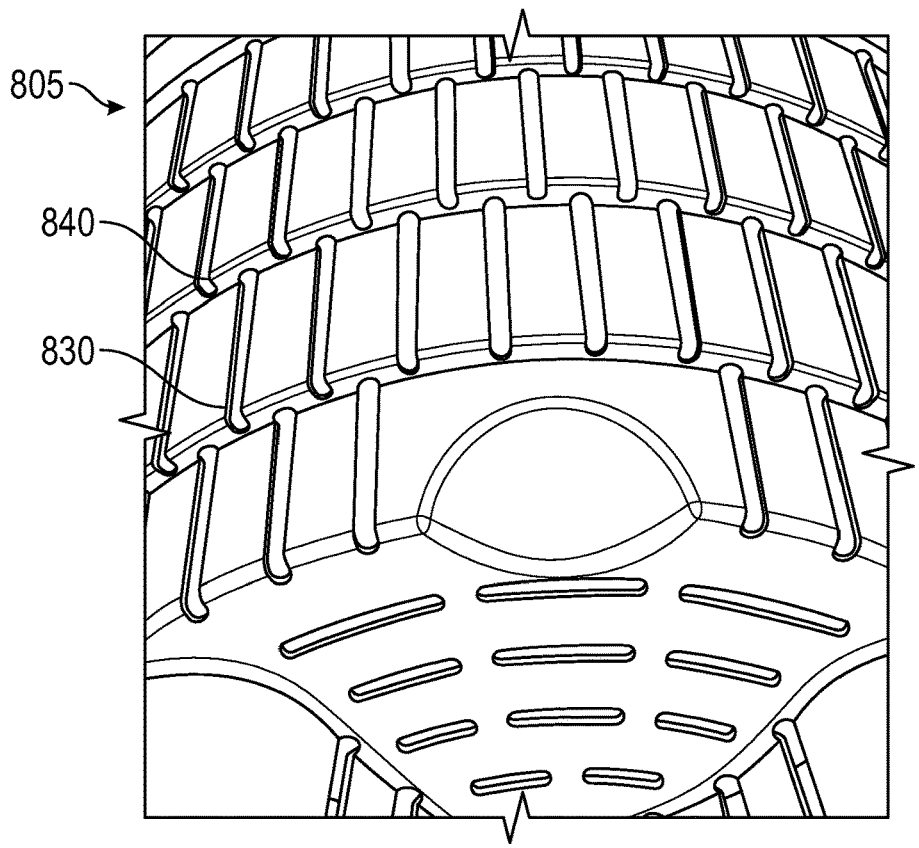
Figure 8D:
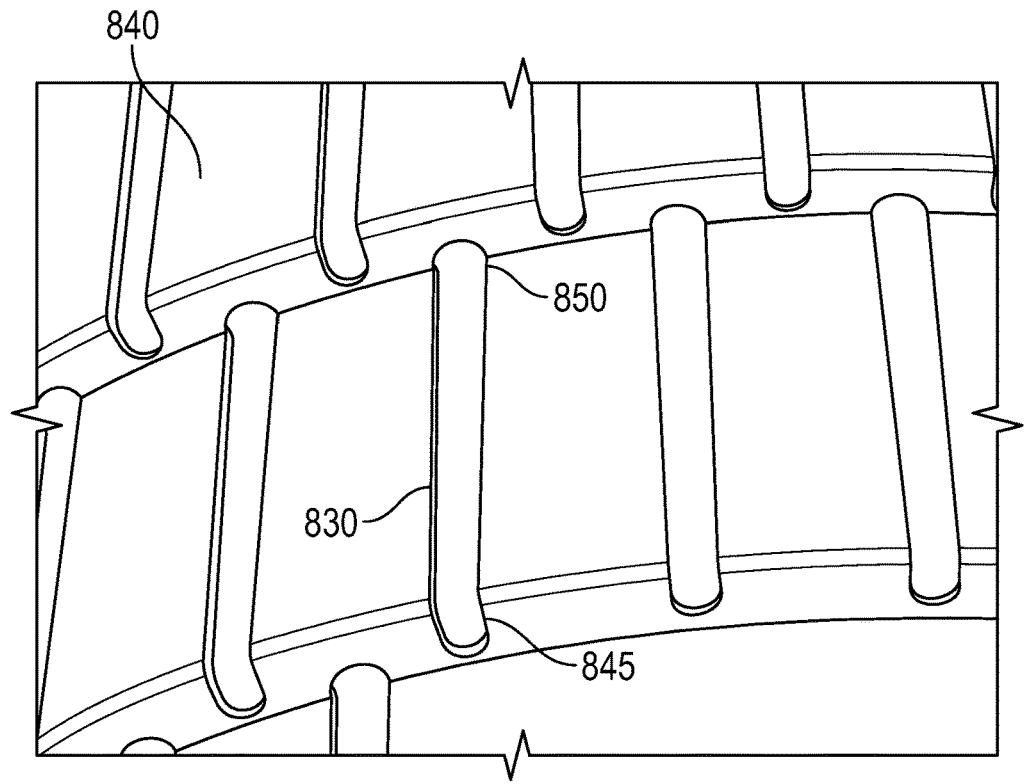

FIG. 8C illustrates the large vents in the tiered profile 840 of the upper basket 805, along with the large vents 830 in the horizontal brace of the upper basket 805. It should be noted that, as illustrated in FIG. 8D the slits forming the vents 830 in the upper vented basket 805 are rounded 845 and bent in at the bottom of the tier and rounded 850 and bent out at the top of the tier. This slit shape removes right angles that could otherwise cause friction with small rootlets when pulling a plant upward for removal. Thus, the tiered profile 840 along with the elimination of right angles is another advantageous aspect of the disclosed embodiments.

Figure 9A:
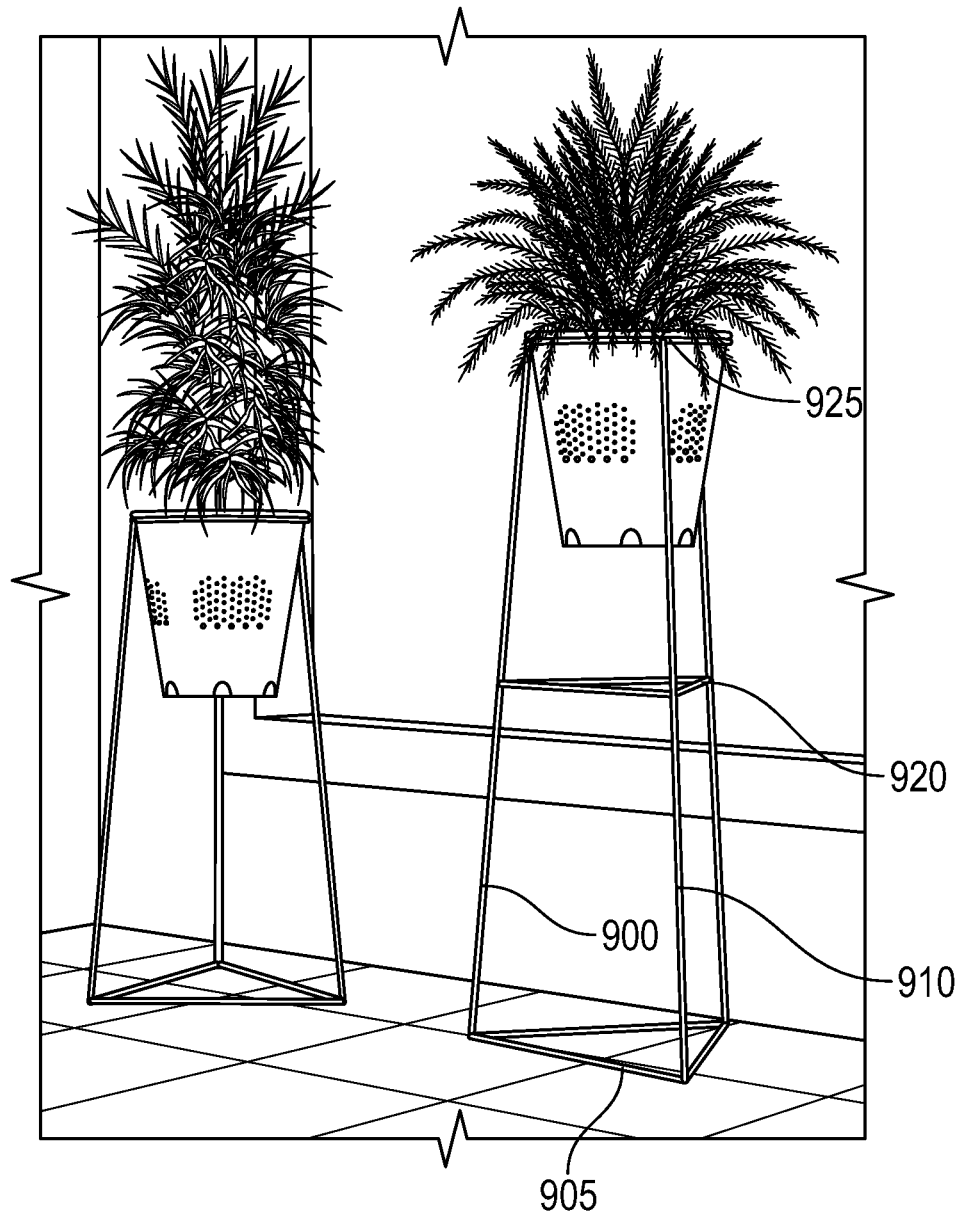
FIG. 9A illustrates a plant stand in accordance with the disclosed embodiments.

FIG. 9A illustrates a pot stand 900 in accordance with the disclosed embodiments. The pot stand 900 can comprise a triangular base 905 with risers 910 configured at the vertices of the triangle base 905. The stand 900 can further comprise a midlevel support triangle 920 in certain embodiments. The top of the plant stand can comprise a stand ring 925 configured with a diameter that is slightly smaller than the diameter of the lip of the pot, so that the plant pot can be inserted through the stand ring 925 as illustrated.

Figure 9B:
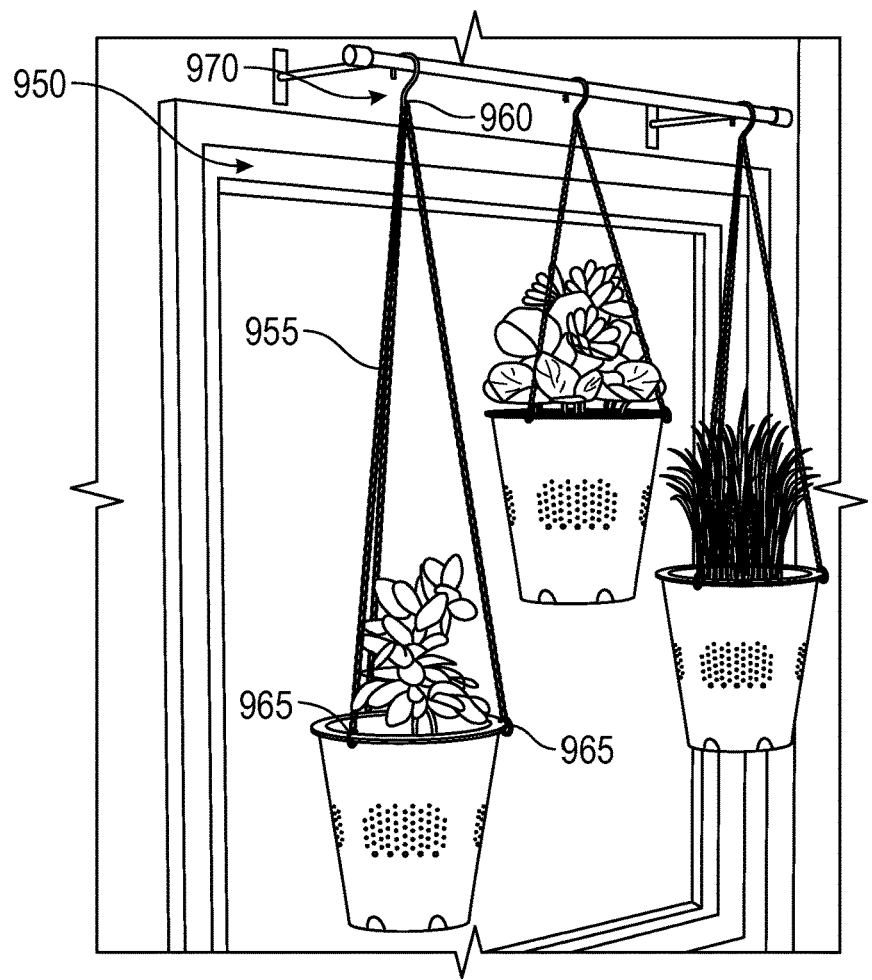
FIG. 9B illustrates a plant hanger in accordance with the disclosed embodiments.

FIG. 9B illustrates a plant hanger 950 in accordance with the disclosed embodiments, the plant hanger 950 can comprise a series of three or more hanging chains 955, which terminate at an upper connection point 960. The ends 965 of each of the hanging chains 955 can comprise a hook 970 configured to engage with the lip of the plant pot. The plant pot can thus be hung from the respective hooks 970 on the ends of the hanging chains 955 as illustrated.

Figure 9C:
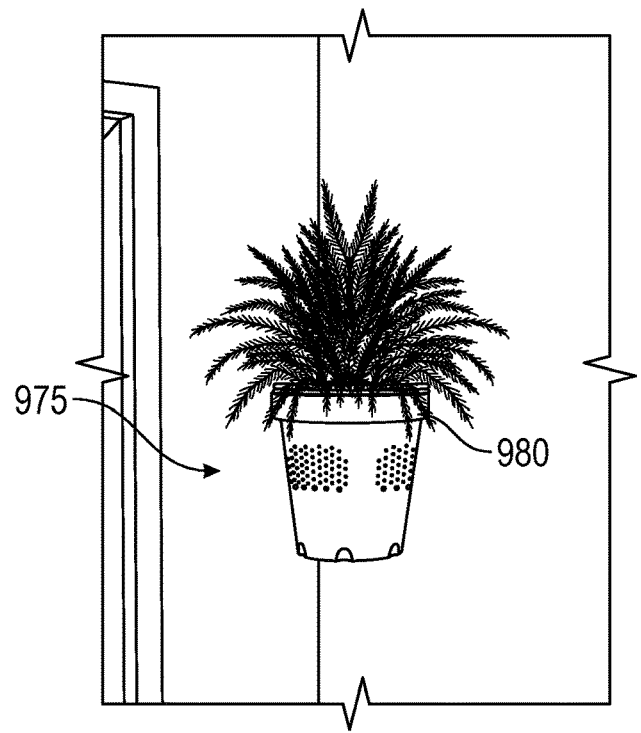
FIG. 9C illustrates a corner pot mount, in accordance with the disclosed embodiments.

FIG. 9C illustrates a corner pot mount 975 in accordance with the disclosed embodiments. The corner pot mount 975 can comprise a pot strap 980 configured with a diameter that is slightly smaller than the diameter of the lip of the pot, so that the plant pot can be inserted through the pot strap 980 as illustrated. The pot strap 980 or pot ring can further include a mounting hook along its exterior perimeter so that the pot strap 980 and pot can be mounted on a wall, wall corner, or other such unusual plant mounting point.

Figure 10:
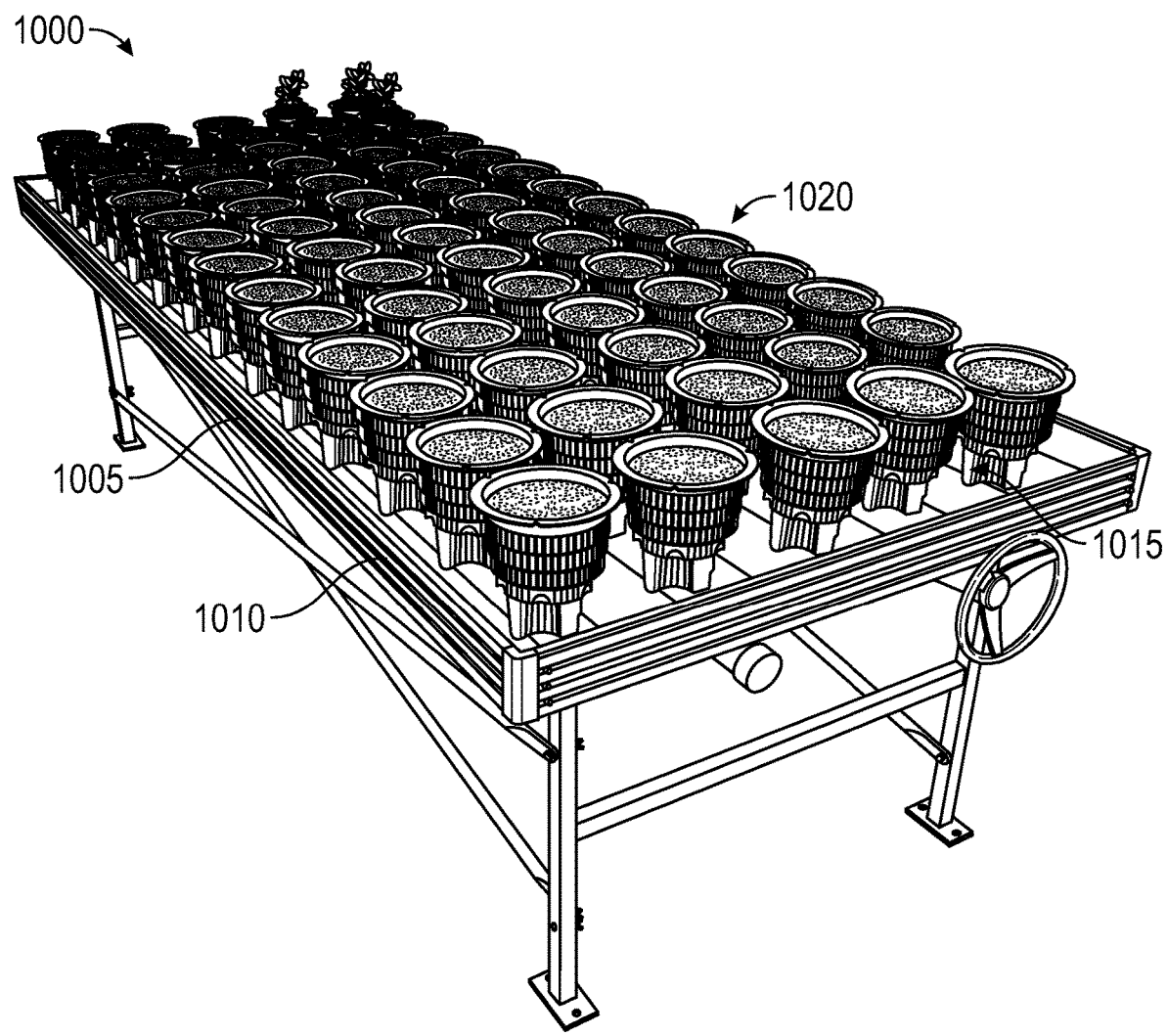
FIG. 10 illustrates a plant pot array assembly, in accordance with the disclosed embodiments.

FIG. 10 illustrates another embodiment comprising a plant pot array assembly 1000. The assembly 1000 includes a plant table 1005 with raised edges 1010 configured such that the upper surface of the table 1005 can retain water. An array of one or more inner vented containers 1020, as disclosed herein, can be disposed on the upper surface 1015 of the table 1010. This allows the table 1010 to be flooded so that growers can thus flood the table periodically for efficient bottom watering of all the plants disposed in the array of inner vented containers on the table.

Figure 11A:
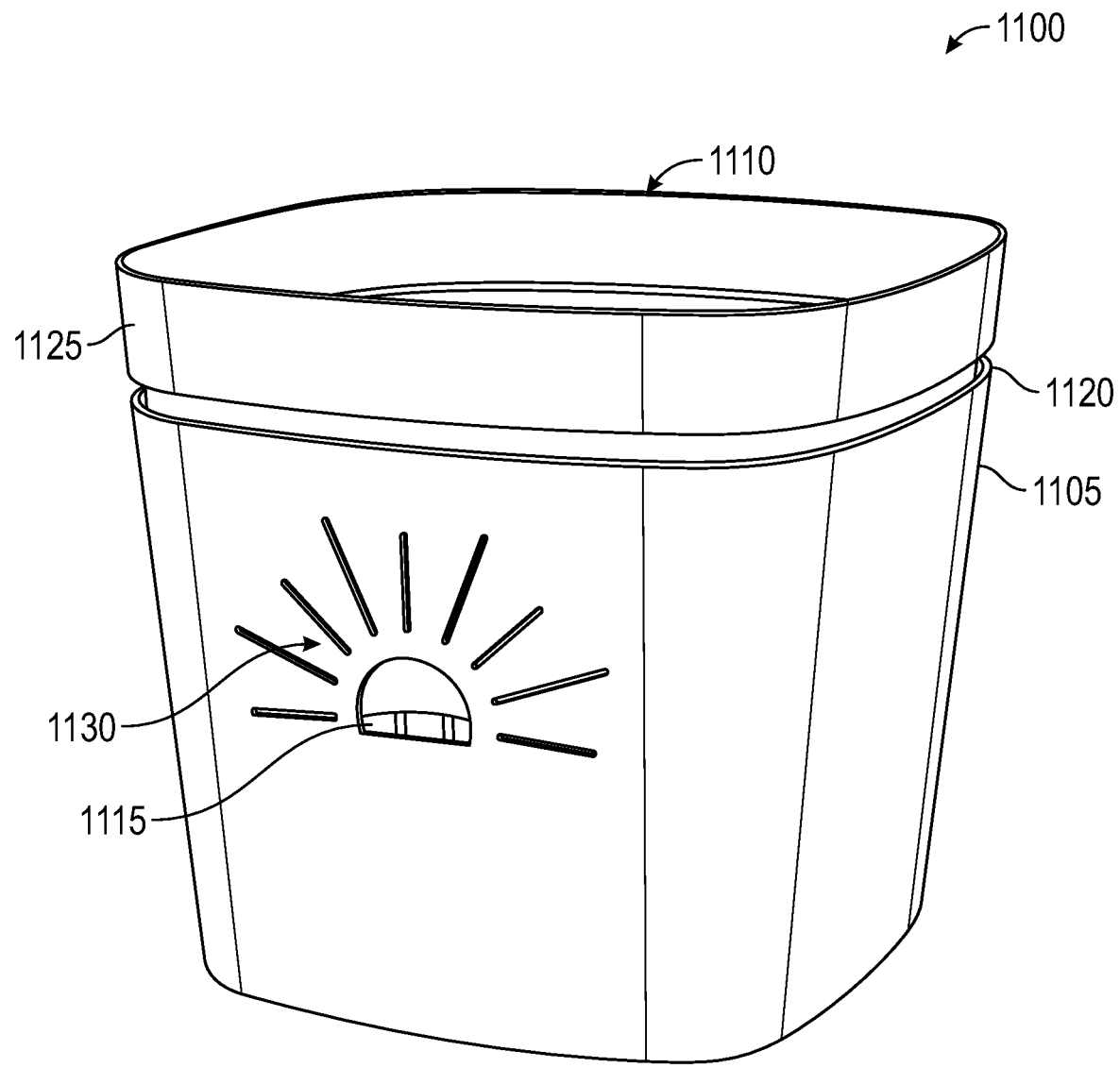
FIG. 11A depicts a perspective view of a pot system/apparatus, in accordance with the disclosed embodiments.
Figure 11B:
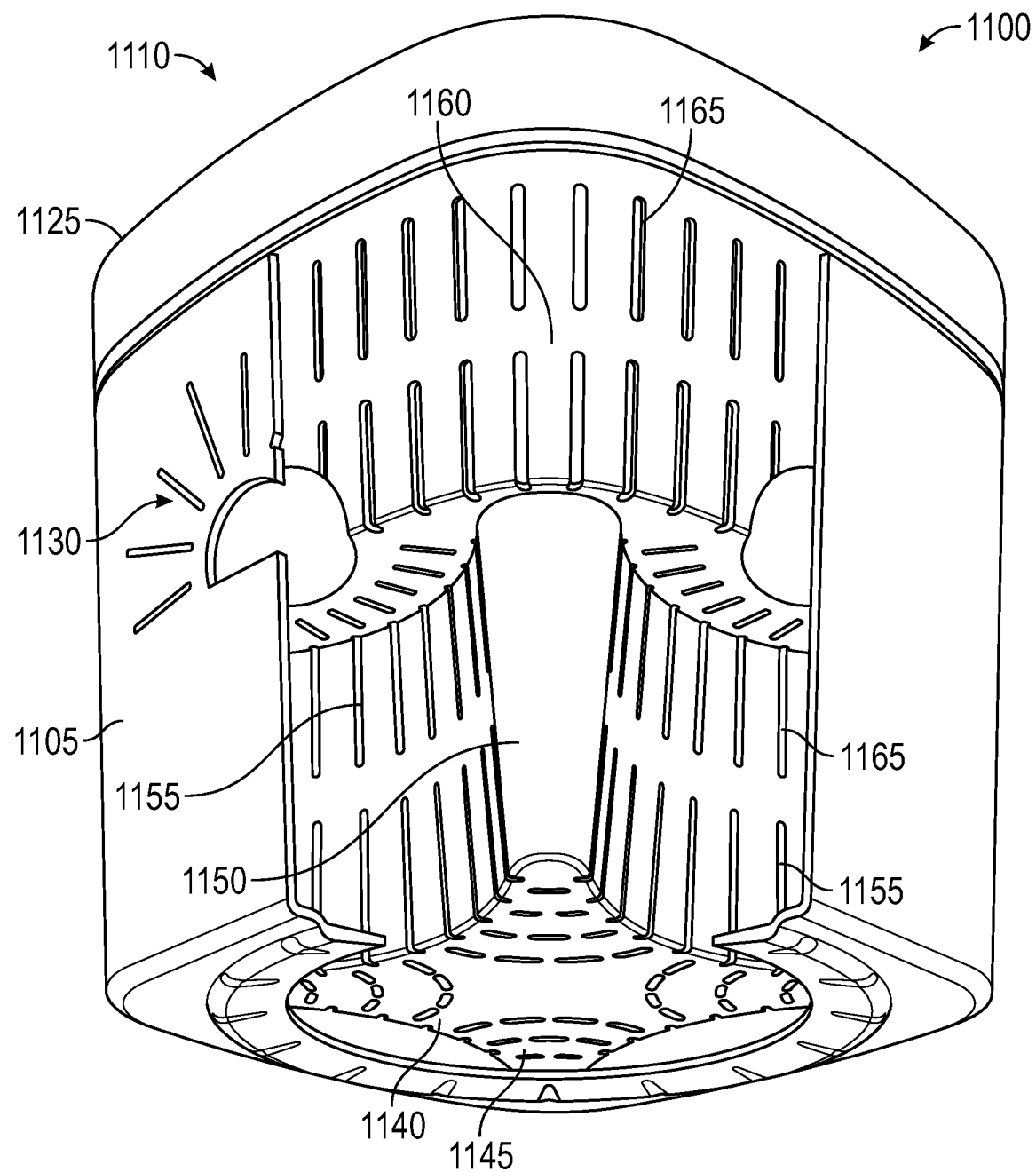
FIG. 11B depicts a cutaway view of a pot system/apparatus, in accordance with the disclosed embodiments.
Figure 11C:
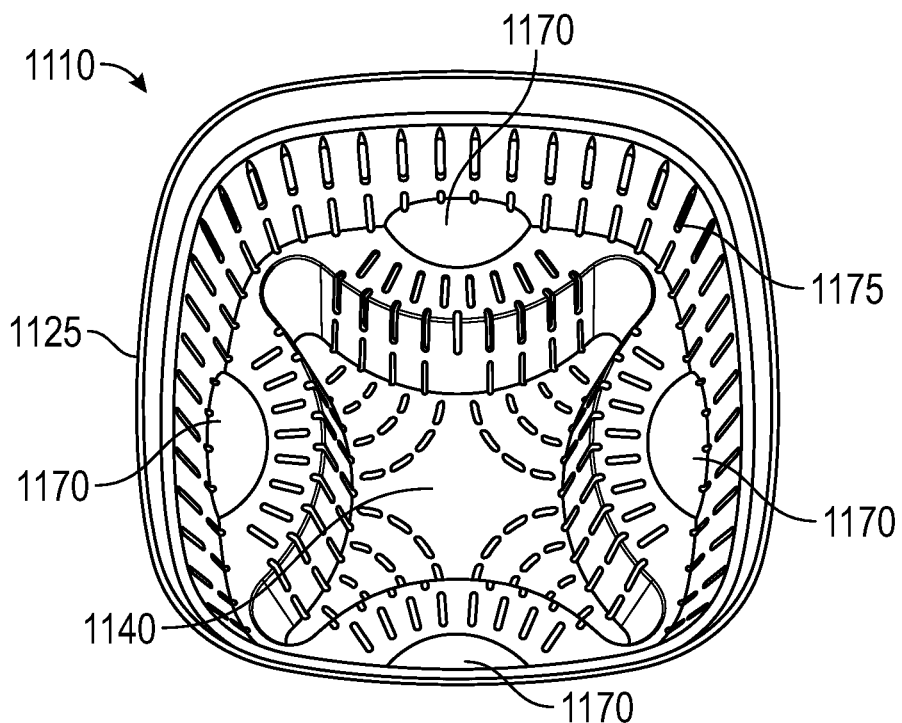
FIG. 11C depicts a top view of a vented inner container, in accordance with the disclosed embodiments.
Figure 11D:
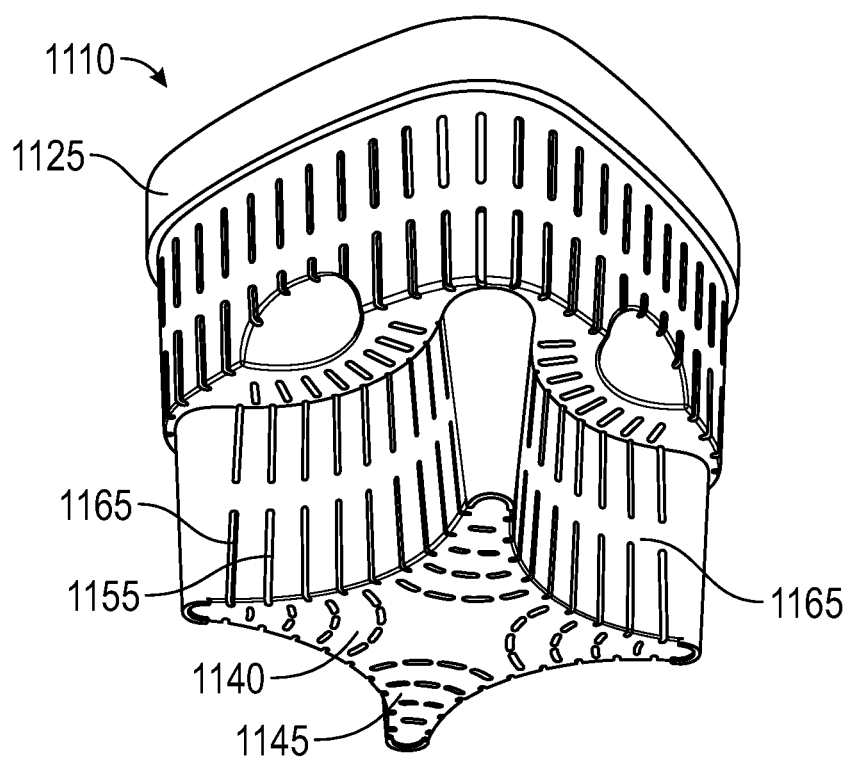
FIG. 11D depicts a perspective view of a vented inner container, in accordance with the disclosed embodiments.
Figure 12:
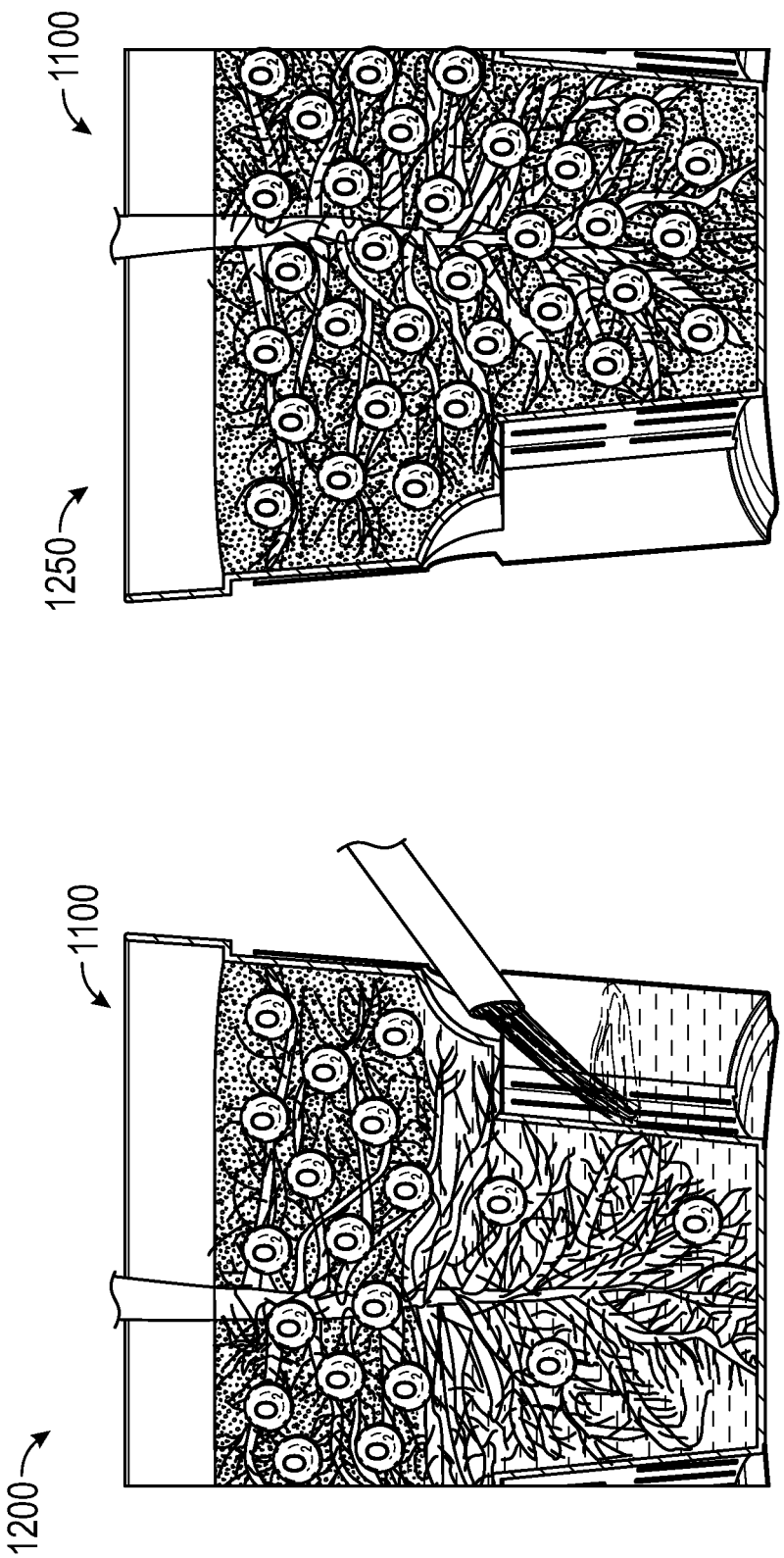
FIG. 12 depicts operational principles of a pot system, in accordance with the disclosed embodiments.
Figure 13:
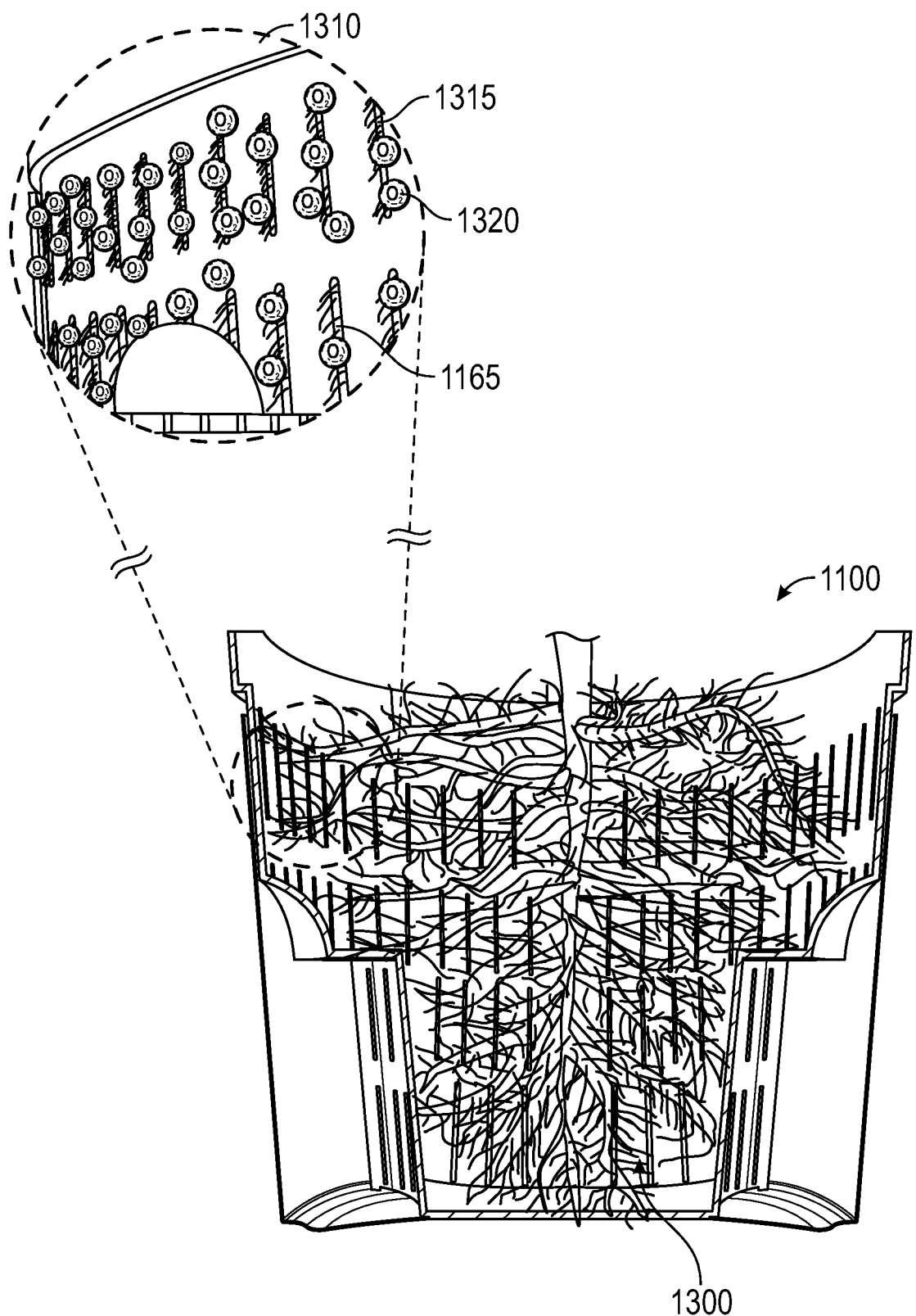
FIG. 13 depicts air pruning of roots growing in a pot system, in accordance with the disclosed embodiments.

FIGS. 11-13 illustrate aspects of another plant pot system 1100, in accordance with the disclosed embodiments.

To prevent root rot, oxygen should be maximized to the root system. To prevent the soil from drying out too quickly a large reservoir of water can be provided to keep the plant hydrated. However, if the reservoir is too large it can create standing water for long periods of time, which in turn promotes more root rot.

The plant pot system 1100, provides optimal aeration and water in a planter that can be aesthetically pleasing while creating ideal growing conditions. The pot 1100 generally comprises an outer shell 1105 and an inner vented container 1110. The outer shell 1105 is configured to hold the inner vented container 1110 in a nested arrangement. The top 1120 of the outer shell 1105 is configured to be below a top lip 1125 of the inner vented container 1110.

The outer shell 1105 can further include a spout 1115 configured for accepting water. The spout 1115 can be selected to be sufficiently large to allow a view to the bottom of the outer shell 1105. This can facilitate water level inspection.

The outer shell 1105 can also include at least one air vent 1130. One such air vent 1130 is illustrated in FIGS. 11A, but in other embodiments, additional air vents can be provided. In certain embodiments, the air vents 1130 can be configured to include multiple shaped slots and apertures. In certain embodiments, these slots and apertures can be arranged in a manner that is aesthetically pleasing.

FIG. 11B provides a cutaway view of the outer shell 1105, to illustrate the relative relationship of the outer shell 1105 and inner vented container 1110. As illustrated in FIG. 11B, the inner vented container 1110 can include flat base 1140, with vents 1145 arranged in arcs. The inner vented container can further include a soil chamber 1150. The soil chamber 1150 has four concave sides 1155 that allows ample room for soil and root growth, resulting in excellent plant and root growth. The concave sides 1155 also enable a large amount of water to be held in the outer shell, below the upper basket 1160 for constant root hydration, without standing water. This coupled with aeration slots 1165, provided on all sides of the inner vented container, provides the perfect ratio of oxygen, water and soil which creates a breathing effect. The inner vented container 1110 includes spout recesses 1170 which can comprise quarter dome-shaped recesses which allow water to enter through the spout 1115.

FIG. 11C provides a top view of the inner vented container 1110, and FIG. 11D illustrates a perspective view of the inner vented container 1110, further illustrating aspects thereof.

FIG. 12 illustrates a diagram of the operation of the pot 1100 in accordance with the disclosed embodiments. When the outer shell 1105 is filled with water and subsequently fills the soil with water through capillary action as illustrated in 1200, it can be understood as an "inhale state". As the plant uses the water in combination with evaporation, the space in the soil that had water now has oxygen as shown in 1250. This can be understood as "an exhaled state". The cycle is constant and continues every time the pot 1100 is filled with water.

This physical characteristics of the outer shell 1105 and inner vented container 1110, along with their relationship to one another also helps maximize the development of the root system of a plant in the pot 1100 through the action of creating the optimal growing conditions and air root pruning. To achieve air root pruning for house plants using the systems disclosed herein, such as pot 1100, the plant roots grow until reach the inner surface 1175 of the planter, to get pruned by oxygen contact.

Air pruning using the pot 1100 is illustrated in FIG. 13. As FIG. 13 illustrates, a root system 1300 of a plant will extend outward until it reaches the inner surface 1175 of the inner vented container 1110. Exploded view 1310 shows the tips of the roots 1315 that reach the aeration slots 1165 are pruned by the air 1320 which can provide up to 200% more root surface area in the pot 1100.

This disclosed pot 1100 provides the correct oxygen, water, and soil ratio (optimal growing conditions) so that the plant can survive the harsh and unnatural conditions of a conventional house. In addition, the breathing effect of the pot 1100 creates an ideal environment for air root pruning before root rot sets in. Optimal plant growth facilitates vigorous root development once the root is "air pruned" but this can only be accomplished with the perfect ratio of oxygen, water, and soil.

The plant pot 1100 thus provides optimal growing conditions, and fosters an extensive root system. Over time this further enhances the plants success. As such, the plant becomes healthier and more robust over time, as opposed to the normal course of potted plants which tend to wither and die as they are left inside.

Finally, the airflow through the roots and upper plant parts, made possible by, for example, the pot 1100, or other plant pots disclosed herein, helps scrub the air of Volatile Organic Compounds in an associated indoor environment. This is a consequence of the soil microbiome (a colony of bacteria) that are cultivated as a result of optimal conditions for reproduction provided in the pot 1100. Specifically, For the bacteria to reproduce, be effective and reach critical mass, it requires inoculation of mycorrhizae bacteria, organic matter for a food source, and ideal oxygen, water, and soil conditions.

The pot 1100 and the specific shape and configuration of the outer shell 1105 and inner vented container, are configured to provide the soil conditions necessary for the air scrubbing bacterial growth. The constant exchange of water and oxygen surrounding the roots (home of the bacteria), made possible by the arrangement of the outer shell 1105 and inner vented container 1110, allows the bacteria to reproduce and flourish and more effectively scrubs the air of VOC's.

In certain embodiments, the disclosed pot, or naked root planter, uses passive convection, without the use of motors or electricity. Air passes through the inlet, surrounds the inner pot with exposed soil and roots and exits with clean air. Specially selected soil ingredients provide an easy and inexpensive way to inoculate and increase the soil microbiome for greater air purification.

As aspect of the embodiments is to passively drive air through the inlet, circling around the inner pot and existing through the top of the pot. The movement of air through the inlet, circling around the inner pot "clips" the ends of the root hairs. This greatly increases root surface area of plants planted in the naked root planter.

Furthermore, the disclosed systems provide improved soil aeration. The movement of air through the soil, provides oxygen throughout the root system, which reduces or eliminates root rot. Visual inspection reduces overwatering by providing simple indication of water level, to prevent users from adding watering without letting the soil dry out.

It should also be noted that the disclosed combination of bottom watering, evenly delivering water to plant roots and even air exposure to the roots and soil from all sides, creates an optimal environment for plant health, reducing over and under watering.

The disclosed embodiments further reduce the need for transplanting. With the disclosed embodiments, a much larger plant and fibrous root system can be developed, so a plant can live and thrive in the same planter for a much longer time. While air pruning from all sides of the inner pot provides an extensive root system, when combined with even water and air plus Mycorrhizal Fungi the system facilitates development of an unprecedented robust root mass that results in an ultra-healthy plant, resilient to many maladies (root rot, insects, diseases) that plague indoor plants.

This disclosed embodiments further ease the task of watering. The disclosed embodiments allow watering from the spout located on the outer shell. Visual inspection allows watering at the perfect time (when the reservoir is empty), without guessing if it's the correct time. Capillary action is achieved with the disclosed systems to that plant soil and roots are evenly moistened by pulling water through all the nooks and crannies of the soil from below.

In accordance with the disclosed embodiments, delivering even water and air to plant roots and soil on all sides makes water timing much less critical than with conventional planters. With conventional planters watering is held in abeyance until the soil dries out completely all the way to the bottom of the pot. This is contrary to the way most people water a plant, which is generally done on a schedule, and which can eventually lead to root rot. With the disclosed systems, a user can keep the water reservoir filled at all times or can simply use a schedule such as once a week without risk of over watering/root rot and plant failure. The disclosed system provides oxygen on the bottom unlike other approaches, which is critical, (see for example, the bottom ribs in FIG. 2) as this is the area that stays wettest for the longest period of time in all other planters. This is accomplished by elevating the inner pot with legs.

The system can further be used for passive air purification. Exposed roots and soil to outside air have good microbes that ingest air pollutants.

Thus, in accordance with the disclosed embodiments, the systems described herein provide healthier plants; longer periods of time between watering; less root rotting due to overwatering because of the aerating features; better larger plant growth; easy watering (large opening) from the side of the planter; easy watering level viewing (provided by the large opening) as opposed to mechanical gauges that stick and sometimes just fail and add complexity; passive phytoremediation/air purifying—the root system is exposed to air, plant soil microbes are exposed to indoor oxygen which removes air borne pollutants; optional carbon filter liner and soil amendments (Coco Coir and activated Charcoal) further enhance phytoremediation; and heavy duty construction for indoor/outdoor use.

Based on the foregoing, it can be appreciated that a number of embodiments, preferred and alternative, are disclosed herein. For example, in an embodiment, a pot apparatus comprises an outer shell and an inner vented container configured so that space between the outer shell and the inner vented container supports air circulation between the outer shell and the inner vented container.

In an embodiment the pot apparatus further comprises a spout configured on the outer shell. In an embodiment, the spout further comprises a protrusion for accepting water.

In an embodiment the pot apparatus further comprises at least one vent in the outer shell. In an embodiment, the vent further comprises a plurality of slits and apertures.

In an embodiment, the inner vented container further comprises a grid of supports. In an embodiment, the grid of supports comprises a plurality of horizontal supports and a plurality of material containing strips. In an embodiment, the inner vented container further comprises a lower cylinder.

In an embodiment the pot apparatus further comprises a plurality of offset struts configured to separate the outer shell from the inner vented container.

In an embodiment the pot apparatus further comprises a soil mixture disposed in the inner vented container, the soil mixture comprising at least one of Coco Coir soil medium, Mycorrhizal Fungi Inoculant, and Organic Humic soil.

In an embodiment, a pot comprises an outer shell, an inner vented container configured to fit inside the outer shell, the inner vented container further comprising: an upper basket and a lower wicking chamber.

In an embodiment, the pot further comprises a spout configured on the outer shell, the spout further comprising a protrusion for accepting water. In an embodiment, the pot further comprises at least one vent in the outer shell. In an embodiment, the lower wicking chamber further comprises a substantially x-shaped base and at least one concave cutaway side. In an embodiment, the upper basket further comprises a plurality of vents.

In an embodiment, a pot system comprises an outer shell, an inner vented container configured to fit inside the outer shell, the inner vented container further comprising: a top lip, an upper basket, and a soil chamber. In an embodiment, the outer shell further comprises a spout and at least one vent. In an embodiment, the inner vented container further comprises at least one concave side. In an embodiment, the inner vented container further comprises a base configured to fit inside the outer shell and at least one vent formed in the base. In an embodiment, the inner vented container further comprises at least one vent in the upper basket.

It will be appreciated that variations of the above-disclosed and other features and functions, or alternatives thereof, may be desirably combined into many other different systems or applications. Also, it should be appreciated that various presently unforeseen or unanticipated alternatives, modifications, variations, or improvements therein may be subsequently made by those skilled in the art which are also intended to be encompassed by the following claims.

What is claimed is:

1. A pot apparatus comprising:
an outer shell; and
an inner vented container configured so that space between the outer shell and the inner vented container supports air circulation between the outer shell and the inner vented container, the inner vented container comprising:
a grid of supports forming a basket;
a plurality of legs connected to a bottom of the basket;
a lower cylinder formed in the bottom surface of the basket, the lower cylinder being located inside a circumference defined by the plurality of legs, the lower cylinder further comprising:
a continuous sidewall extending below the bottom of the basket, with a plurality of vents formed in the sidewall; and
a bottom surface connected to the continuous sidewall with a plurality of vents formed in the bottom surface of the lower cylinder.

2. The pot apparatus of claim 1 further comprising:
a spout configured on the outer shell.

3. The pot apparatus of claim 2 wherein the spout further comprises:
a protrusion for accepting water.

4. The pot apparatus of claim 2 further comprising:
at least one vent in the outer shell.

5. The pot apparatus of claim 4 wherein the vent further comprises:
a plurality of slits and apertures.

6. The pot apparatus of claim 1 wherein the grid of supports further comprises:
a plurality of vertically arranged support struts; and
a plurality of intersecting horizontal supports, forming a plurality of rows of equidistant vents surrounding a circumference of the inner vented container.

7. The pot apparatus of claim 6 wherein spacing in the grid of supports is selected to maximize surface area for an interface between roots and air.

8. The pot apparatus of claim 1 wherein the plurality of legs extend below the bottom surface of the
a lower cylinder.

9. The pot apparatus of claim 1 further comprising:
a plurality of offset struts attached to a top lip of the inner vented container and configured to separate the outer shell from the inner vented container.

10. The pot apparatus of claim 5 further comprising:
a soil mixture disposed in the inner vented container, the soil mixture comprising at least one of:
Coco Coir soil medium;
Mycorrhizal Fungi Inoculant; and
Organic Humic soil.

11. A pot comprising:
an outer shell;
an inner vented container configured to fit inside the outer shell, the inner vented container further comprising:
an upper basket with a tiered outer profile comprising at least one larger diameter tier above at least one smaller diameter tier;
a plurality of slits formed in each tier of the upper basket wherein each of the slits further comprises:
a vertical portion of the slit connecting to a curved portion of the slit formed in a lip between at least one larger diameter tier and the at least one smaller diameter tier:
a plurality of legs connected to a bottom of the upper basket; and
a lower cylinder formed in the bottom surface of the upper basket, the lower cylinder being located inside a circumference defined by the plurality of legs, the lower cylinder further comprising:
a continuous sidewall extending below the bottom of the upper basket, with a plurality of vents formed in the sidewall; and
a bottom surface connected to the continuous sidewall with a plurality of vents formed in the bottom surface of the lower cylinder.

12. The pot of claim 11 further comprising:
a spout configured on the outer shell, the spout further comprising a protrusion for accepting water.

13. The pot of claim 11 further comprising:
at least one vent in the outer shell.

14. The pot of claim 11 wherein the plurality of slits formed in the at least one larger diameter tier do not align with the plurality of slits formed in the at least one smaller diameter tier.

* * * * *